(12) United States Patent
Choi

(10) Patent No.: US 12,468,337 B2
(45) Date of Patent: Nov. 11, 2025

(54) ELECTRONIC DEVICE

(71) Applicant: SAMSUNG DISPLAY CO., LTD., Yongin-si (KR)

(72) Inventor: Kyungmin Choi, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 790 days.

(21) Appl. No.: 17/862,870

(22) Filed: Jul. 12, 2022

(65) Prior Publication Data

US 2023/0119209 A1 Apr. 20, 2023

(30) Foreign Application Priority Data

Oct. 20, 2021 (KR) ........................ 10-2021-0140011

(51) Int. Cl.
*G06F 1/16* (2006.01)

(52) U.S. Cl.
CPC .......... *G06F 1/1616* (2013.01); *G06F 1/1643* (2013.01); *G06F 1/1656* (2013.01); *G06F 1/1681* (2013.01); *G06F 1/1684* (2013.01)

(58) Field of Classification Search
None
See application file for complete search history.

(56) References Cited

U.S. PATENT DOCUMENTS

| 6,260,417 B1 * | 7/2001 | Watanabe | G01L 19/147 73/754 |
| 9,298,221 B2 * | 3/2016 | Choi | G06F 1/1652 |
| 9,318,398 B2 * | 4/2016 | Lee | H01L 22/34 |
| 9,857,832 B2 | 1/2018 | Kim et al. | |
| 10,028,395 B2 | 7/2018 | Chen et al. | |
| 10,368,452 B2 | 7/2019 | Yun et al. | |
| 10,930,883 B2 | 2/2021 | Park | |
| 11,245,782 B2 | 2/2022 | Hong | |
| 11,488,499 B2 * | 11/2022 | Shepelev | G01B 7/30 |
| 12,112,609 B2 * | 10/2024 | Han | G08B 21/18 |
| 12,228,969 B2 * | 2/2025 | Huang | G06F 1/1616 |
| 2013/0127606 A1 * | 5/2013 | Chang | G09G 3/006 340/384.7 |
| 2018/0217639 A1 | 8/2018 | Jones et al. | |
| 2019/0298251 A1 * | 10/2019 | Kanaumi | A61B 5/0071 |
| 2020/0142445 A1 * | 5/2020 | Lee | G06F 1/1652 |
| 2020/0175897 A1 * | 6/2020 | Choi | G06F 1/1652 |
| 2020/0395569 A1 * | 12/2020 | Song | H10K 59/40 |

(Continued)

FOREIGN PATENT DOCUMENTS

KR 101726306 B1 4/2017
KR 101861348 B1 6/2018

(Continued)

*Primary Examiner* — William J Klimowicz
(74) *Attorney, Agent, or Firm* — CANTOR COLBURN LLP

(57) ABSTRACT

An electronic device includes a display panel including a folding area and a non-folding area adjacent to the folding area, a display controller which controls a driving of the display panel, and a detection sensor disposed adjacent to the folding area and which measures a modulus of the folding area in a folded state of the display panel. The display controller controls the display panel based on a measured modulus in a way such that an image for temperature adjustment is displayed on the display panel.

20 Claims, 11 Drawing Sheets

(56) References Cited

U.S. PATENT DOCUMENTS

| | | | |
|---|---|---|---|
| 2021/0036259 A1* | 2/2021 | Song | H10K 59/8793 |
| 2021/0193962 A1* | 6/2021 | Song | B32B 7/12 |
| 2021/0255670 A1* | 8/2021 | Lee | G06F 1/1652 |
| 2021/0400852 A1* | 12/2021 | Kim | G06F 1/1641 |
| 2022/0100234 A1* | 3/2022 | Kishimoto | G06F 1/1616 |
| 2022/0139273 A1* | 5/2022 | Shepelev | H10N 30/302 |
| | | | 361/679.02 |
| 2022/0236818 A1* | 7/2022 | Oh | G06F 3/0488 |
| 2022/0404867 A1* | 12/2022 | Shin | G06F 1/1681 |
| 2023/0076740 A1* | 3/2023 | Gu | G06F 3/0412 |
| 2023/0297136 A1* | 9/2023 | Ryu | G06F 1/1683 |
| | | | 361/679.01 |

FOREIGN PATENT DOCUMENTS

| | | | | |
|---|---|---|---|---|
| KR | 101986617 B1 | 6/2019 | | |
| KR | 20190064552 A | 6/2019 | | |
| KR | 20190124844 A | 11/2019 | | |
| KR | 20200077931 A | 7/2020 | | |
| KR | 102165889 B1 | 10/2020 | | |
| KR | 20220023952 A * | 3/2022 | | G06F 1/1656 |
| KR | 20220037007 A * | 3/2022 | | G06F 3/046 |

\* cited by examiner

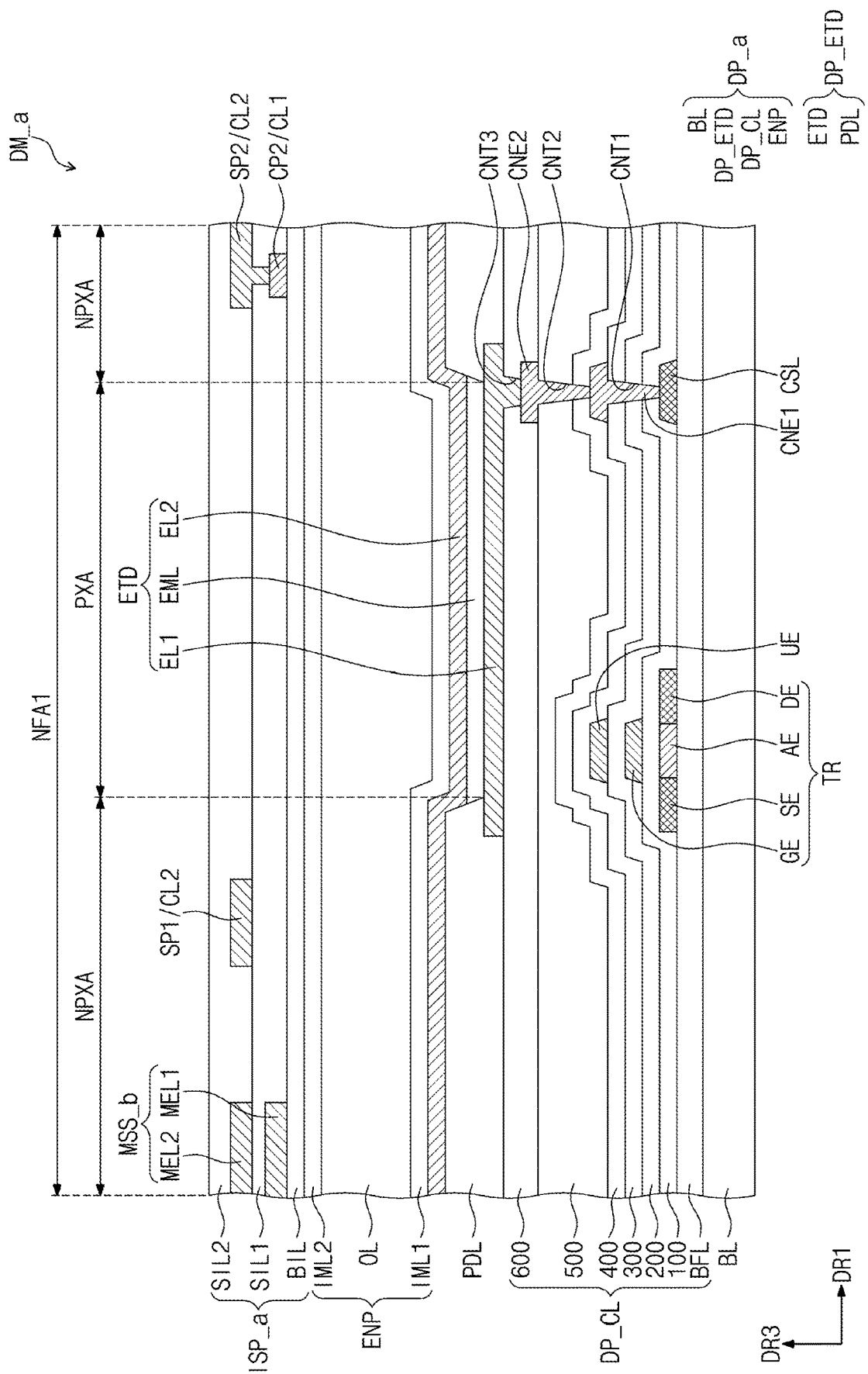

ELECTRONIC DEVICE

This application claims priority to Korean Patent Application No. 10-2021-0140011, filed on Oct. 20, 2021, and all the benefits accruing therefrom under 35 U.S.C. § 119, the content of which in its entirety is herein incorporated by reference.

BACKGROUND

1. Field

Embodiments of the disclosure described herein relate to an electronic device, and more particularly, relate to an electronic device including a foldable display panel.

2. Description of the Related Art

Various forms of electronic devices are used to provide image information.

An electronic device includes a display device that displays an image. In such an electronic device, the display device may sense an input applied from the outside through a display area thereof and may display various images to provide information to a user. With the development of electronic devices in various shapes, display devices and display areas having various shapes are implemented.

SUMMARY

Embodiments of the disclosure provide an electronic device having improved reliability.

According to an embodiment, an electronic device includes a display panel including a folding area and a non-folding area adjacent to the folding area and a display controller which controls the display panel. In such an embodiment, the electronic device includes a detection sensor disposed adjacent to the folding area, where the detection sensor measures a modulus of the folding area in a folded state of the display panel. In such an embodiment, the display controller controls the display panel based on a measured modulus in a way such that an image for temperature adjustment is displayed on the display panel.

In an embodiment of the disclosure, the detection sensor may include a piezoelectric sensor.

In an embodiment of the disclosure, the electronic device may further include a sensing controller which receives a sensing signal including information about the measured modulus from the detection sensor. In such an embodiment, the sensing controller may transmit, to the display controller, an image control signal generated by comparing a magnitude of the measured modulus and a magnitude of a preset modulus. In such an embodiment, the display controller may control the display panel based on the image control signal such that the image for temperature adjustment is displayed on the display panel.

In an embodiment of the disclosure, the sensing controller may not generate, or deactivate, the image control signal when the magnitude of the measured modulus is greater than the magnitude of the preset modulus.

In an embodiment of the disclosure, the image for temperature adjustment may be displayed on the folding area.

In an embodiment of the disclosure, the non-folding area may include a first non-folding area and a second non-folding area, and the folding area may be disposed between the first non-folding area and the second non-folding area. In such an embodiment, the electronic device may further include a first support layer disposed under the display panel.

In an embodiment of the disclosure, the detection sensor may be disposed under the first support layer. In such an embodiment, the detection sensor may include a first sub-detection sensor which overlaps the first non-folding area and a second sub-detection sensor which overlaps the second non-folding area.

In an embodiment of the disclosure, the first and second sub-detection sensor may not overlap the folding area.

In an embodiment of the disclosure, the electronic device may further include a heat radiating layer disposed under the first support layer. The detection sensor may be disposed under the heat radiating layer.

In an embodiment of the disclosure, the electronic device may further include a digitizer disposed between the first support layer and the heat radiating layer.

In an embodiment of the disclosure, the electronic device may further include a second support layer disposed between the digitizer and the heat radiating layer.

In an embodiment of the disclosure, the first support layer may include a first receiving section. In such an embodiment, the detection sensor may be disposed under the first support layer to correspond to the first receiving section.

In an embodiment of the disclosure, the electronic device may further include a heat radiating layer disposed under the first support layer. In such an embodiment, the heat radiating layer may include a second receiving section corresponding to the first receiving section. In such an embodiment, the detection sensor may be disposed under the heat radiating layer to correspond to the first receiving section and the second receiving section.

In an embodiment of the disclosure, the electronic device may further include an input sensing layer disposed on the display panel, where the input sensing layer may sense an external input. In such an embodiment, the detection sensor may be disposed inside the input sensing layer.

In an embodiment of the disclosure, the electronic device may further include an external case in which the display panel is accommodated. In such an embodiment, the non-folding area may include a first non-folding area and a second non-folding area, and the folding area may be disposed between the first non-folding area and the second non-folding area. In such an embodiment, the external case may include a first case corresponding to the first non-folding area, a second case corresponding to the second non-folding area, and a third case corresponding to the folding area.

In an embodiment of the disclosure, the third case may include a hinge and a fixing part which controls an operation of the hinge. In such an embodiment, the fixing part may fix the hinge when a magnitude of the measured modulus is greater than a magnitude of a preset modulus.

In an embodiment of the disclosure, the first case may include a first coupling part, and the second case may include a second coupling part. In such an embodiment, the first and second coupling parts may remain in a coupled state, in which the first and second coupling parts are coupled with each other, when a magnitude of the measured modulus is greater than a magnitude of a preset modulus in the coupled state.

According to an embodiment, an electronic device includes a display panel including a first non-folding area, a second non-folding area, and a folding area disposed between the first non-folding area and the second non-folding area and a display controller which controls the display panel. In such an embodiment, the electronic device includes a detection sensor disposed adjacent to the folding area, where the detection sensor measures a modulus of the folding area in a folded state of the display panel and an external case in which the display panel and the detection sensor are accommodated. In such an embodiment, the external case is fixed in a folded state when a magnitude of a measured modulus is greater than a magnitude of a preset modulus.

In an embodiment of the disclosure, the external case may include a first case corresponding to the first non-folding area, a second case corresponding to the second non-folding area, and a third case corresponding to the folding area. In such an embodiment, the third case may include a hinge and a fixing part which controls an operation of the hinge. In such an embodiment, the hinge may be fixed when the magnitude of the measured modulus is greater than the magnitude of the preset modulus.

In an embodiment of the disclosure, the external case may include a first case corresponding to the first non-folding area, a second case corresponding to the second non-folding area, and a third case corresponding to the folding area. In such an embodiment, the first case may include a first coupling part, and the second case may include a second coupling part. In such an embodiment, the first and second coupling parts may remain in a coupled state, in which the first and second coupling parts are coupled with each other, when the magnitude of the measured modulus is greater than the magnitude of the preset modulus in the coupled state.

BRIEF DESCRIPTION OF THE DRAWINGS

The above and other features of the disclosure will become apparent by describing in detail embodiments thereof with reference to the accompanying drawings.

FIG. 8 is a sectional view of a display module according to an embodiment of the disclosure.

DETAILED DESCRIPTION

Figure 1A:
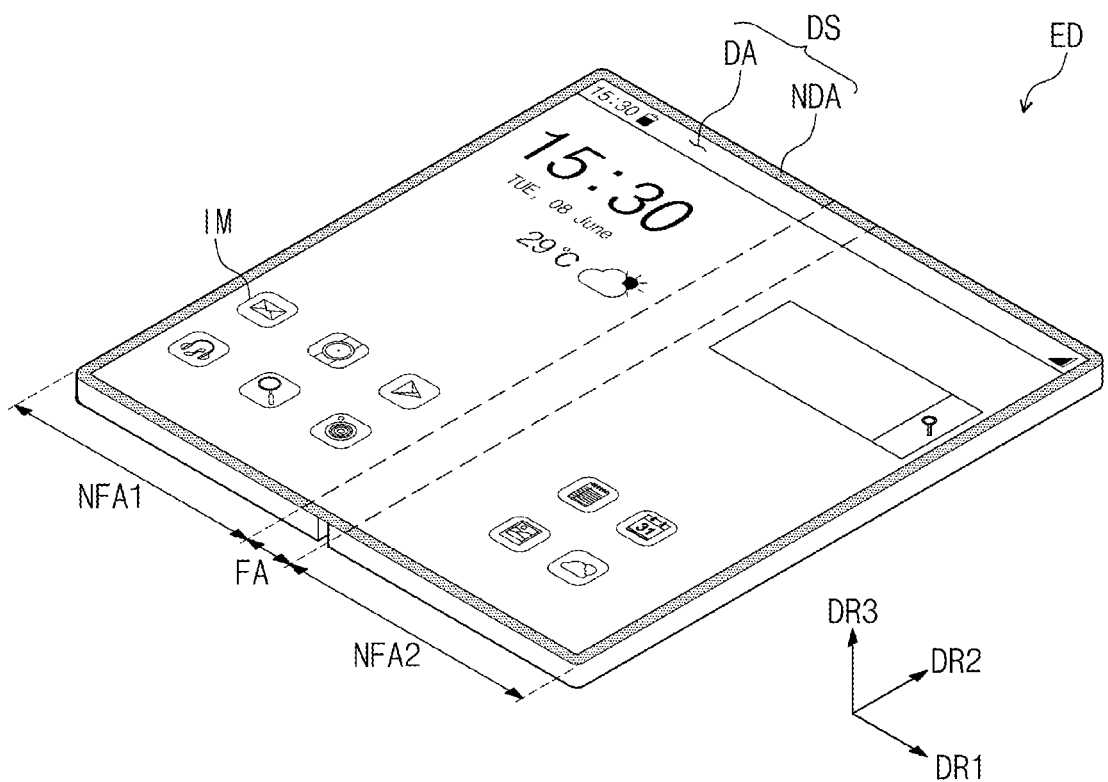
FIGS. 1A to 1C are perspective views of an electronic device according to an embodiment of the disclosure.

The invention now will be described more fully hereinafter with reference to the accompanying drawings, in which various embodiments are shown.

This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

Like reference numerals refer to like elements throughout. Additionally, in the drawings, the thicknesses, proportions, and dimensions of components are exaggerated for convenience of description. As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to the accompanying drawings.

Figure 1B:
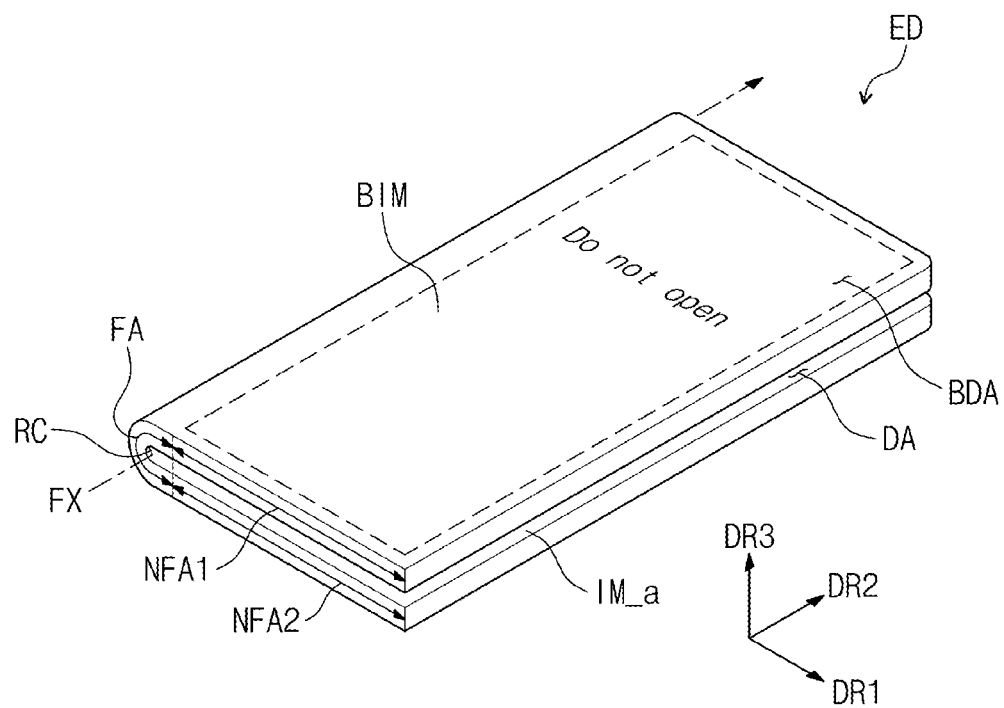
Figure 1C:
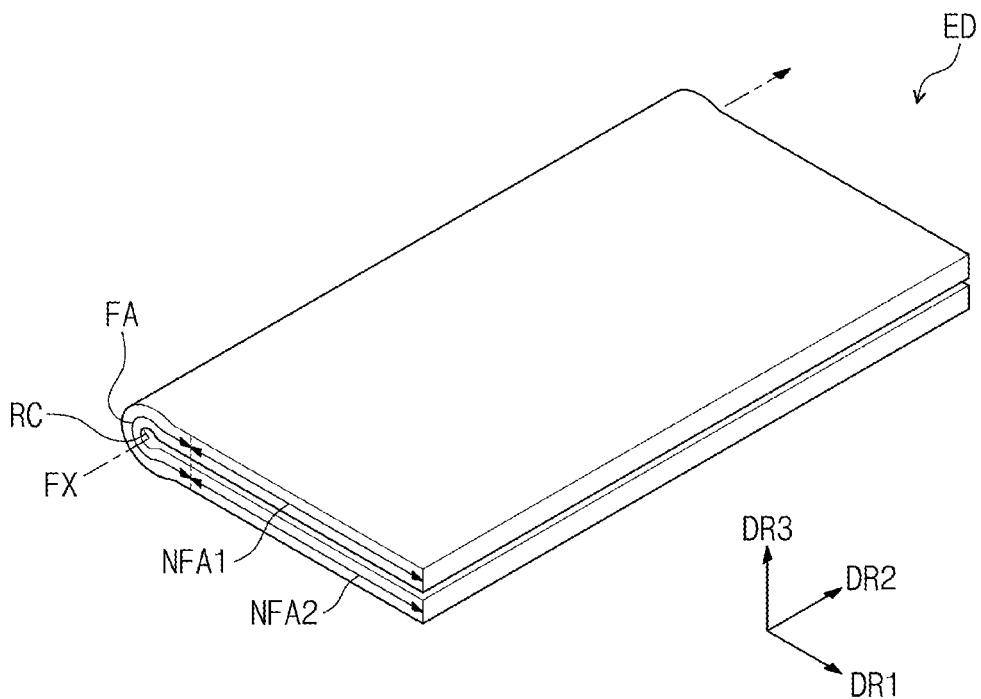

FIGS. 1A to 1C are perspective views of an electronic device according to an embodiment of the disclosure. FIG. 1A illustrates an unfolded state of the electronic device, and FIGS. 1B and 1C illustrate a folded state of the electronic device.

Referring to FIGS. 1A to 1C, an embodiment of the electronic device ED according to the disclosure may be a device activated based on an electrical signal. FIGS. 1A to 1C illustrate an embodiment where the electronic device ED is a smart phone. However, the disclosure is not limited thereto, and the electronic device ED may be an electronic device such as a tablet computer, a notebook computer, a game machine, or the like. These are merely illustrative, and the electronic device ED may include other forms of electronic devices as long as the electronic devices do not deviate from the concept of the disclosure.

In an embodiment of the disclosure, the electronic device ED has the shape of a rounded rectangle with short sides facing a first direction DR1 and long sides facing a second direction DR2 crossing the first direction DR1. However, without being limited thereto, the electronic device ED may have various shapes. The electronic device ED may include a display surface DS defined by the first direction DR1 and the second direction DR2 crossing the first direction DR1. The electronic device ED may provide an image IM to a user through the display surface DS. The display surface DS, on which the image IM is displayed, may correspond to the front surface of the electronic device ED. In such an embodiment, the front surface (or, the upper surface) and the rear surface (or, the lower surface) of each member are defined with respect to the direction in which the image IM is displayed. The front surface and the rear surface may be opposite each other in a third direction DR3 or a thickness direction of the electronic device ED, and the normal directions of the front surface and the rear surface may be parallel to the third direction DR3.

The separation distance between the front surface and the rear surface of the electronic device ED in the third direction DR3 may correspond to the thickness of the electronic device ED in the third direction DR3. Here, the directions indicated by the first, second, and third directions DR1, DR2, and DR3 may be relative concepts and may be changed to different directions.

The display surface DS of the electronic device ED may include a display area DA and a non-display area NDA around the display area DA. The display area DA may display the image IM, and the non-display area NDA may not display the image IM. The non-display area NDA may surround the display area DA. However, without being limited thereto, the shape of the display area DA and the shape of the non-display area NDA may be variously modified.

The electronic device ED may include a folding area FA and a plurality of non-folding areas NFA1 and NFA2. The non-folding areas NFA1 and NFA2 may include the first non-folding area NFA1 and the second non-folding area NFA2. The folding area FA may be disposed between the first non-folding area NFA1 and the second non-folding area NFA2 in the first direction DR1.

In an embodiment, as illustrated in FIG. 1B, the folding area FA may be folded about a folding axis FX parallel to the second direction DR2. The folding area FA has a predetermined curvature and a predetermined radius of curvature RC in a folded state. The first non-folding area NFA1 and the second non-folding area NFA2 may face each other. The electronic device ED may be folded in an in-folding manner such that the display area DA is not exposed to the outside. In an embodiment of the disclosure, the image IM displayed on the display area DA, e.g., the image illustrated in FIG. 1A, is not displayed on the display area DA when the electronic device ED is folded in an in-folding manner. The image IM of FIG. 1A may be an image displayed on the display area DA in the unfolded state of the electronic device ED. In an embodiment of the disclosure, an image IM_a for temperature adjustment may be displayed on the display area DA when the electronic device ED is folded in an in-folding manner. Displaying the image IM_a for temperature adjustment on the display area DA when the electronic device ED is folded in an in-folding manner will be described below in detail.

In an embodiment of the disclosure, the electronic device ED may further include a rear display area BDA. The rear display area BDA is a display area exposed to the outside when the electronic device ED is folded in an in-folding manner. The rear display area BDA may be exposed to the outside to provide an image BIM to the user even when the electronic device ED is folded in an in-folding manner. In an embodiment of the disclosure, the rear image BIM displayed on the rear display area BDA may be an image including a message warning the user not to unfold the electronic device ED. In an embodiment of the disclosure, the rear image BIM may include a warning message such as "Do not open". However, the disclosure is not limited thereto, and the rear image BIM may not include the warning message, but may include information to be displayed to the user. Displaying the rear image BIM including the warning message "Do not open" on the rear display area BDA when the electronic device ED is folded in an in-folding manner will be described below in detail.

In an embodiment of the disclosure, the electronic device ED may be folded in an out-folding manner such that the display area DA is exposed to the outside. The rear display area BDA may not be exposed to the outside when the electronic device ED is folded in an out-folding manner. In an embodiment of the disclosure, when the electronic device ED is folded in an out-folding manner, an image including a message warning the user not to open the electronic device ED may be displayed on a portion of the display area DA.

In an embodiment of the disclosure, the electronic device ED may be configured such that an in-folding or out-folding motion is repeatedly performed in an unfolded state, but is not limited thereto. In an embodiment of the disclosure, the electronic device ED may be configured to operate in a selected one of an unfolding motion, an in-folding motion, or an out-folding motion. In an embodiment, the electronic device ED may include only the display area DA and may not include the rear display area BDA.

In an embodiment, as illustrated in FIG. 1B, the distance between the first non-folding area NFA1 and the second non-folding area NFA2 may be substantially the same as the radius of curvature RC. Alternatively, as illustrated in FIG.

1C, the distance between the first non-folding area NFA1 and the second non-folding area NFA2 may be smaller than the radius of curvature RC. FIGS. 1B and 1C are illustrated based on the display surface DS, and an external case EDC (refer to FIG. 2) that forms the exterior of the electronic device ED may make contact with distal end areas of the first non-folding area NFA1 and the second non-folding area NFA2.

Figure 2:
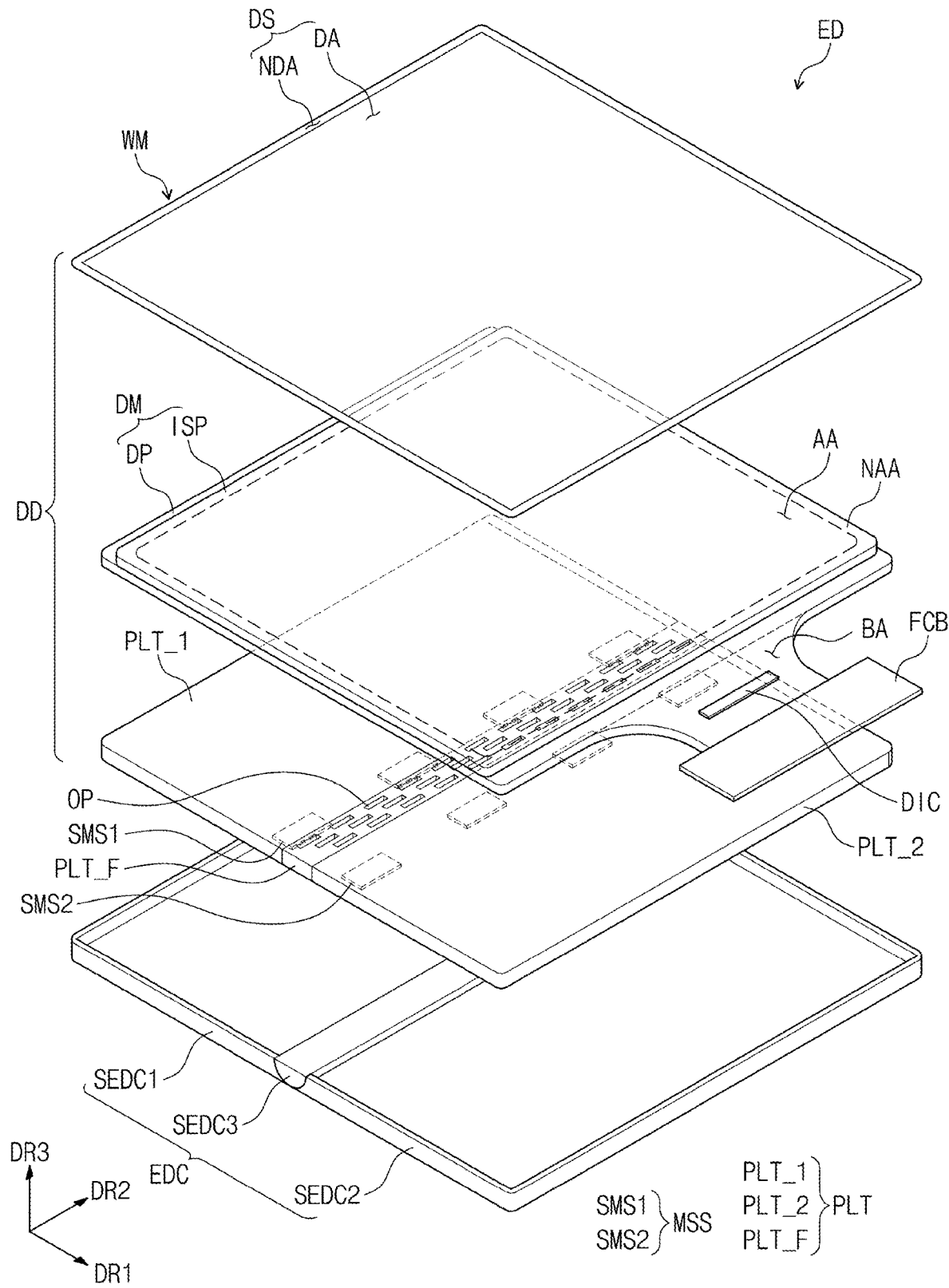
FIG. 2 is an exploded perspective view of the electronic device according to an embodiment of the disclosure.

FIG. 2 is an exploded perspective view of the electronic device according to an embodiment of the disclosure.

In an embodiment, as illustrated in FIG. 2, the electronic device ED may include a display device DD and the external case EDC. In an embodiment of the disclosure, the electronic device ED may further include mechanical structures for controlling a folding motion of the display device DD. Detailed descriptions of the mechanical structures will be given below.

The display device DD generates the image IM (refer to FIG. 1A) and senses an external input. The display device DD includes a window WM, a display module DM, and a support layer PLT (referred to as a first support layer). The window WM provides or defines the front side of the electronic device ED. The window WM may include or be formed of a transparent material through which the image IM is able to be output. The window WM protects the upper surface of the display module DM. The above-described non-display area NDA of the electronic device ED may be formed or defined by printing a material having a predetermined color on one area of the window WM. In an embodiment of the disclosure, the window WM may include a bezel pattern BP (refer to FIG. 5) for defining the non-display area NDA. The bezel pattern BP may be a colored organic film and may be formed by, for example, a coating method. Detailed description of the window WM will be given below.

In an embodiment of the disclosure, the display module DM may include a display panel DP and an input sensing layer ISP. Although only the display panel DP and the input sensing layer ISP among stacked structures of the display module DM are illustrated in FIG. 2 for convenience of illustration, the display module DM may substantially further include a plurality of components disposed over the display panel DP and the input sensing layer ISP. A stack structure of the display module DM will be described below in detail.

The display panel DP is not particularly limited and may be, for example, an emissive display panel such as an organic light emitting display panel, an inorganic light emitting display panel, or a quantum dot light emitting display panel. An emissive layer of the organic light emitting display panel may include an organic light emitting material. An emissive layer of the inorganic light emitting display panel may include an inorganic light emitting material. An emissive layer of the quantum dot light emitting display panel may include quantum dots, quantum rods, and the like. Hereinafter, for convenience of description, embodiment where the display panel DP is an organic light emitting display panel will be described in detail.

The input sensing layer ISP may be disposed over the display panel DP and may sense an external input. The input sensing layer ISP may be disposed directly on the display panel DP. According to an embodiment of the disclosure, the input sensing layer ISP may be formed on the display panel DP by a continuous process. In such an embodiment, where the input sensing layer ISP is disposed or provided directly on the display panel DP, an internal adhesive film (not illustrated) is not disposed between the input sensing layer ISP and the display panel DP. In an alternative embodiment, an internal adhesive film may be disposed between the input sensing layer ISP and the display panel DP. In such an embodiment, the input sensing layer ISP may not be manufactured together with the display panel DP by a continuous process and may be manufactured separately from the display panel DP and then fixed to the upper surface of the display panel DP by the internal adhesive film.

The display module DM may display the image IM based on an electrical signal and may transmit/receive information about an external input. The display module DM may have an active area AA and an non-active area NAA defined therein. The active area AA may be defined as an area that outputs the image IM provided by display module DM. In such an embodiment, the active area AA may be defined as an area where the input sensing layer ISP senses an external input applied from the outside.

The non-active area NAA is adjacent to the active area AA. In an embodiment, for example, the non-active area NAA may surround the active area AA. However, this is illustrative, and the ineffective area NAA may be defined in various shapes and is not limited to any one embodiment. According to an embodiment, the active area AA of the display module DM may correspond to at least part of the display area DA. The expression "an area/portion corresponds to another area/portion" used herein means that the areas/portions overlap each other and is not limited to having a same area.

The display module DM may further include a flexible circuit board FCB and a driver chip DIC.

In an embodiment of the disclosure, the driver chip DIC may be disposed on the non-active area NAA of the display panel DP. In an embodiment of the disclosure, the non-active area NAA may include a bending area BA. The driver chip DIC may be disposed on the bending area BA. The bending area BA may be bent and disposed on the lower surface of the display module DM. The flexible circuit board FCB may be coupled to the bending area BA of the display panel DP. The flexible circuit board FCB may be connected to a main circuit board. In an embodiment of the disclosure, the main circuit board may include a circuit for driving the display module DM.

The driver chip DIC may include drive elements (e.g., a data drive circuit) for driving pixels of the display panel DP. Although FIG. 2 illustrates an embodiment having a structure in which the driver chip DIC is mounted on the display panel DP, the disclosure is not limited thereto. In an alternative embodiment, for example, the driver chip DIC may be mounted on the flexible circuit board FCB.

The support layer PLT may be disposed under the display module DM. The support layer PLT supports components disposed on the support layer PLT and maintains an unfolded state and a folded state of the display module DM and the window WM. In an embodiment of the disclosure, the support layer PLT includes a first support portion PLT_1 overlapping the first non-folding area NFA1 (refer to FIG. 1A), a second support portion PLT_2 overlapping the second non-folding area NFA2 (refer to FIG. 1A), and a folding portion PLT_F overlapping the folding area FA (refer to FIG. 1A). The folding portion PLT_F may include a plurality of openings OP. A structure of the support layer PLT and an arrangement relationship between the support layer PLT and the display module DM will be described below in detail.

The external case EDC illustrated in FIG. 2 is coupled with the display device DD, particularly, the window WM and accommodates the display module DM. The external case EDC includes a first case SEDC1 corresponding to the first non-folding area NFA1, a second case SEDC2 corresponding to the second non-folding area NFA2, and a third case SEDC3 corresponding to the folding area FA. In an embodiment of the disclosure, the third case SEDC3 may further include a hinge HNG (refer to FIG. 9A) for connecting the first and second cases SEDC1 and SEDC2 to each other.

In an embodiment of the disclosure, the display device DD may further include a detection sensor MSS. The detection sensor MSS may be disposed on the rear side of the display device DD. In an embodiment, the detection sensor MSS may be disposed under the support layer PLT. The detection sensor MSS is disposed adjacent to the folding area FA. The detection sensor MSS includes a plurality of first sub-detection sensors SMS1 overlapping the first non-folding area NFA1 and a plurality of second sub-detection sensors SMS2 overlapping the second non-folding area NFA2. Operation of the detection sensor MSS will be described below in detail.

Figure 3:
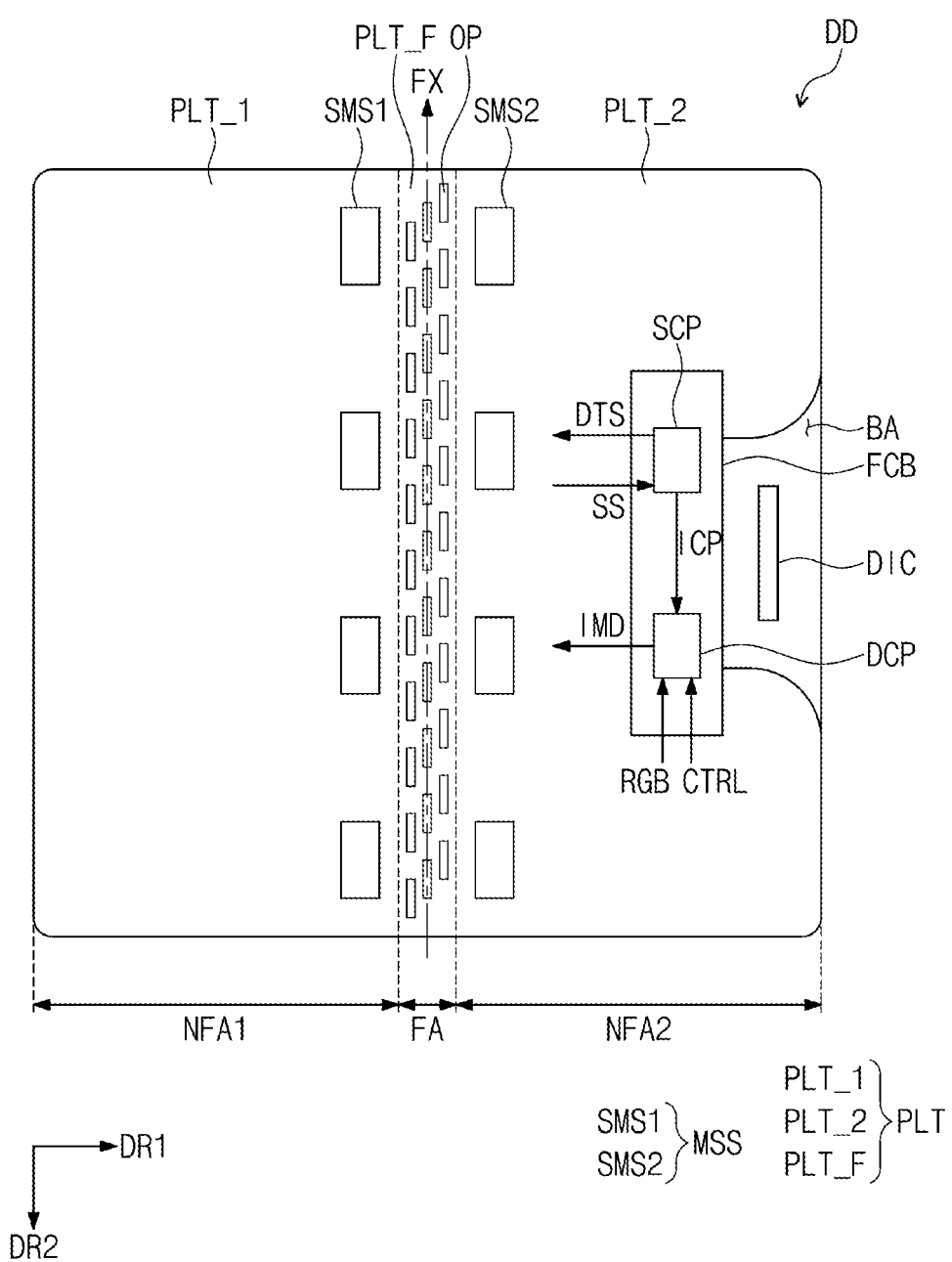
FIG. 3 is a rear view of a display device according to an embodiment of the disclosure.

FIG. 3 is a rear view of the display device according to an embodiment of the disclosure.

The lower surface of the support layer PLT, the first and second sub-detection sensors SMS1 and SMS2 disposed on the lower surface of the support layer PLT, and the bent display panel DP are illustrated in FIG. 3.

In an embodiment of the disclosure, the plurality of openings OP may be defined in the folding portion PLT_F of the support layer PLT. The openings OP are spaced apart from each other in the first direction DR1 and the second direction DR2. However, the disclosure is not limited thereto, and the folding portion PLT_F may be divided by the openings OP extending in the second direction DR2.

In an embodiment of the disclosure, the plurality of first sub-detection sensors SMS1 are spaced apart from each other in the second direction DR2. The plurality of second sub-detection sensors SMS2 are spaced apart from each other in the second direction DR2. However, this is illustrative, and in an embodiment of the disclosure, the first sub-detection sensors SMS1 may collectively define a single and unitary shape extending in the second direction DR2, and the second sub-detection sensors SMS2 may collectively define a single and unitary shape extending in the second direction DR2.

The driver chip DIC may be mounted on the bending area BA of the display panel DP, and the flexible circuit board FCB may be coupled to the bending area BA of the display panel DP. A display controller DCP that controls the display panel DP (e.g., controls an operation or driving of the display panel DP) (refer to FIG. 2) and a sensing controller SCP that controls the detection sensor MSS (e.g., controls an operation or driving of the detection sensor MSS) may be mounted on the flexible circuit board FCB.

The sensing controller SCP transmits a sensing control signal DTS controlling operation of the detection sensor MSS to the detection sensor MSS. The detection sensor MSS measures the modulus of the folding area FA in a folded state of the electronic device ED (refer to FIG. 2) in response to the sensing control signal DTS. The sensing controller SCP receives a sensing signal SS including information about the measured modulus from the detection sensor MSS. Based on the sensing signal SS, the sensing controller SCP compares the magnitude of the measured modulus and the magnitude of a preset modulus and generates an image control signal ICP. In an embodiment of the disclosure, the preset modulus may be one of moduli of the folding area FA by which the electronic device ED is not damaged when the folded electronic device ED is unfolded.

In an embodiment of the disclosure, the preset modulus may be the highest preset modulus among the moduli of the folding area FA by which the electronic device ED is not damaged. In an embodiment of the disclosure, the magnitude of the modulus of the folding area FA may vary depending on the temperature of the electronic device ED. The magnitude of the modulus of the folding area FA is increased as the temperature of the electronic device ED is decreased. In an embodiment of the disclosure, the temperature of the electronic device ED when the magnitude of the modulus of the folding area FA is equal to the magnitude of the preset modulus may be referred to as the defect-free temperature. Measuring the modulus of the folding area FA by the detection sensor MSS in a folded state of the electronic device ED will be described below in detail.

In an embodiment of the disclosure, the sensing controller SCP generates the image control signal ICP when the magnitude of the measured modulus is greater than the magnitude of the preset modulus. In an embodiment of the disclosure, the magnitude of the modulus of the folding area FA is increased as the temperature of the electronic device ED is decreased. The magnitude of the measured modulus is increased when the temperature of the electronic device ED is lower than the defect-free temperature. When the magnitude of the measured modulus is smaller than or equal to the magnitude of the preset modulus, the sensing controller SCP may not generate the image control signal ICP, or may deactivate the image control signal ICP. In an embodiment of the disclosure, when the temperature of the electronic device ED is higher than or equal to the defect-free temperature, the magnitude of the measured modulus may be smaller than or equal to the magnitude of the preset modulus.

Referring to FIGS. 1B and 3, the display controller DCP receives an image signal RGB and a control signal CTRL from the outside. The display controller DCP generates an image date IMD based on the image signal RGB and transmits the image data IMD to the display panel DP. Based on the image data IMD and the control signal CTRL, the display controller DCP may control the display panel DP such that the image IM is displayed on the display panel DP.

In an embodiment of the disclosure, the display controller DCP receives the image control signal ICP from the sensing controller SCP. When receiving the image control signal ICP from the sensing controller SCP, the display controller DCP may operate in a way such that the image IM_a for temperature adjustment is displayed on the display panel DP. In an embodiment of the disclosure, the image IM_a for temperature adjustment is an image IM_a displayed on the display area DA when the electronic device ED is folded in an in-folding manner. FIG. 1B illustrates an embodiment where the image IM_a for temperature adjustment is displayed on all of the first and second non-folding areas NFA1 and NFA2 and the folding area FA, but not being limited thereto. Alternatively, the image IM_a for temperature adjustment may be displayed on only the folding area FA. In an embodiment, where the image IM_a for temperature adjustment is displayed on all of the first and second non-folding areas NFA1 and NFA2 and the folding area FA, the gray scale of the image IM_a for temperature adjustment that is displayed on the folding area FA may be higher than the gray scale of the image IM_a for temperature adjustment that is displayed on the first and second non-folding areas NFA1 and NFA2.

When the temperature of the electronic device ED is lower than the defect-free temperature, the temperature of the electronic device ED may be raised above the defect-free temperature by displaying the image IM_a for temperature adjustment on the in-folded display panel DP through the sensing controller SCP and the display controller DCP. Accordingly, damage to the electronic device ED may be effectively prevented when the electronic device ED is unfolded.

Figure 4:
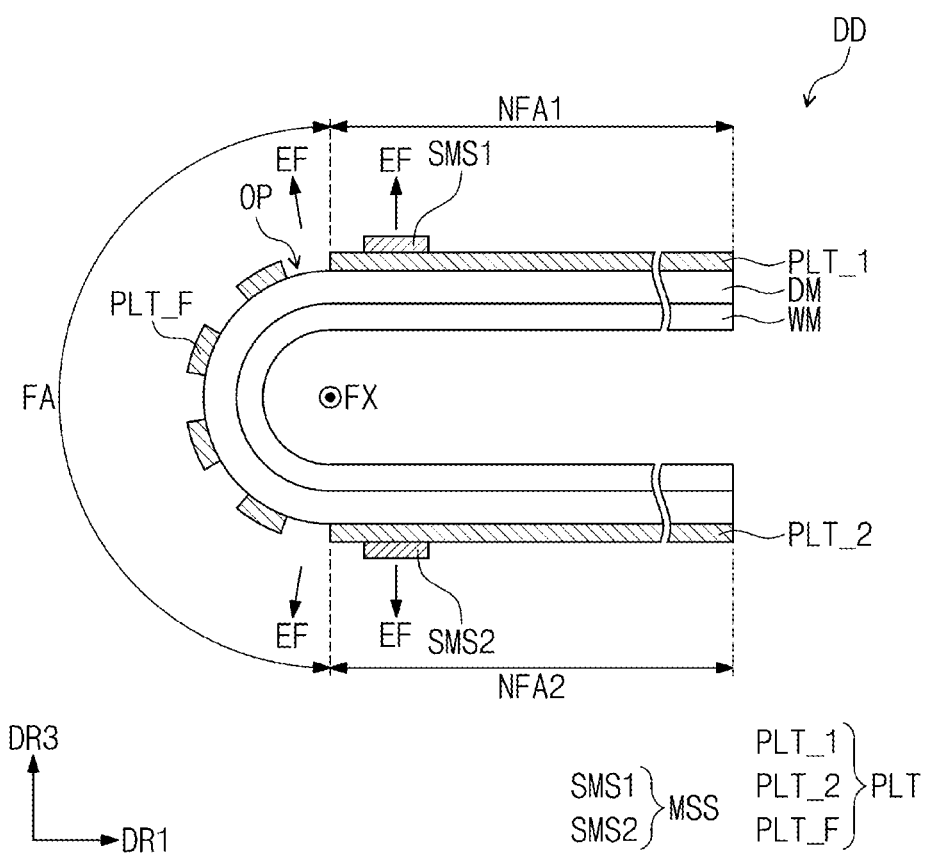
FIG. 4 is a sectional view illustrating the display device according to an embodiment of the disclosure in a folded state.

FIG. 4 is a sectional view illustrating the display device according to an embodiment of the disclosure in a folded state.

Hereinafter, the same or like components as the components described above with reference to FIGS. 1A to 2 will be labeled with the same reference numerals, and any repetitive detailed descriptions thereof will be omitted or simplified.

In an embodiment, the display device DD and the detection sensor MSS, which are some components of the folded electronic device ED (refer to FIG. 1B), are illustrated in FIG. 4. Referring to FIGS. 1A, 1B, and 4, an elastic force EF to return the folded display device DD to the previous state is exerted on the folded display device DD. In an embodiment, the window WM, the display module DM, and the support layer PLT may be deformed when folded, and the elastic force EF to return the window WM, the display module DM, and the support layer PLT to the unfolded state may be generated from the folding area FA. Although the window WM, the display module DM, and the support layer PLT disposed in the first and second non-folding areas NFA1 and NFA2 are not deformed in a folding motion as in an unfolding motion, the elastic force EF is transmitted from the folding area FA to the window WM, the display module DM, and the support layer PLT. The detection sensor MSS overlapping the first and second non-folding areas NFA1 and NFA2 may measure the elastic force EF. In an embodiment of the disclosure, the detection sensor MSS may be disposed adjacent to the folding area FA to measure the elastic force EF transmitted from the folding area FA. In an embodiment of the disclosure, the first sub-detection sensors SMS1 may be disposed on the first non-folding area NFA1 to be adjacent to the folding area FA. The second sub-detection sensors SMS2 may be disposed on the second non-folding area NFA2 to be adjacent to the folding area FA. The first and second sub-detection sensors SMS1 and SMS2 may measure the modulus of the display device DD, based on the measured elastic force EF. In an embodiment of the disclosure, the detection sensor MSS may include a piezoelectric element.

Figure 5:
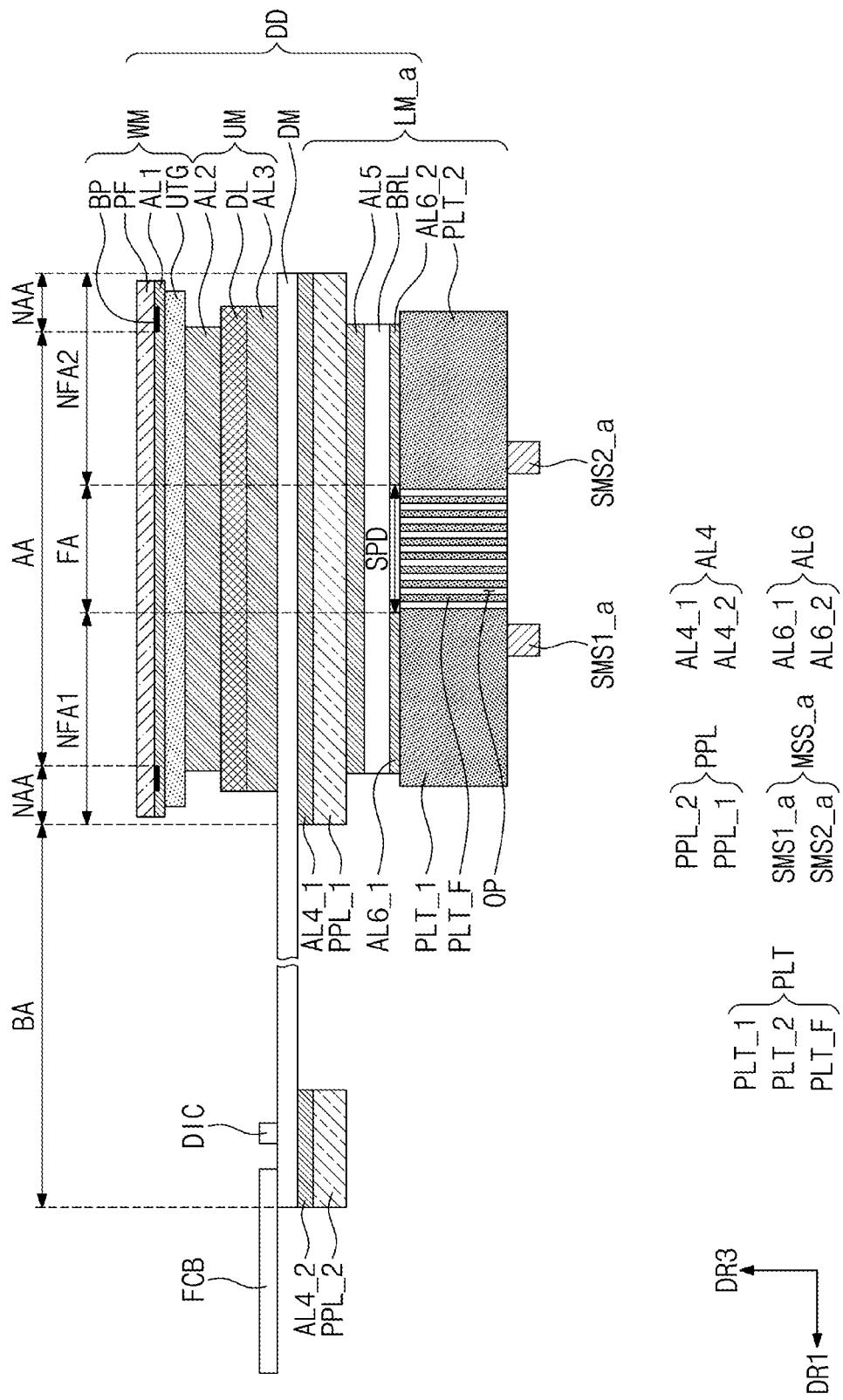
FIG. 5 is a sectional view of the display device according to an embodiment of the disclosure.

FIG. 5 is a sectional view of the display device according to an embodiment of the disclosure.

Referring to FIG. 5, an embodiment of the display device DD includes the window WM, an upper module UM, the display module DM, and a lower module LM_a. Components disposed between the window WM and the display module DM may be collectively referred to as the upper module UM, and components disposed under the display module DM may be collectively referred to as the lower module LM_a.

The window WM may include a thin glass substrate UTG, a window protection layer PF disposed over the thin glass substrate UTG, and the bezel pattern BP disposed on the lower surface of the window protection layer PF. In an embodiment, the window protection layer PF may include a synthetic resin film. The window WM may include an adhesive layer AL1 (hereinafter, referred to as the first adhesive layer) that couples the window protection layer PF and the thin glass substrate UTG to each other.

The bezel pattern BP overlaps the non-active area NAA. The bezel pattern BP may be disposed on one surface of the thin glass substrate UTG or one surface of the window protection layer PF. FIG. 5 illustrates an embodiment where the bezel pattern BP is disposed on the lower surface of the window protection layer PF. Alternatively, without being limited thereto, the bezel pattern BP may be disposed on the upper surface of the window protection layer PF. The bezel pattern BP may be a colored light-blocking film and may be formed by, for example, a coating method. The bezel pattern BP may include a base material and a dye or pigment mixed with the base material.

The thin glass substrate UTG may have a thickness in a range of about 15 micrometers (μm) to about 45 μm. The thin glass substrate UTG may be a chemically strengthened glass substrate. The occurrence of a fold in the thin glass substrate UTG may be minimized even though the thin glass substrate UTG is repeatedly folded and unfolded.

The window protection layer PF may have a thickness in a range of about 50 μm to about 80 μm. The synthetic resin film of the window protection layer PF may include polyimide, polycarbonate, polyamide, triacetylcellulose, polymethylmethacrylate, or polyethylene terephthalate. Although not separately illustrated, at least one of a hard coating layer, an anti-fingerprint layer, and an anti-reflection layer may be disposed on the upper surface of the window protection layer PF.

The first adhesive layer AL1 may include a pressure sensitive adhesive ("PSA") film or an optically clear adhesive ("OCA"). Adhesive layers to be described below may also include a same adhesive as the first adhesive layer ALL The first adhesive layer AL1 may be separated from the thin glass substrate UTG. The window protection layer PF may be relatively easily scratched because the window protection layer PF has a lower strength than the thin glass substrate UTG. In an embodiment, the window protection layer PF may be replaced by attaching a new window protection layer PF to the thin glass substrate UTG after separating an old window protection layer from the first adhesive layer AL1.

In an embodiment, the edge of the thin glass substrate UTG may not overlap the bezel pattern BP on a plane or when viewed from a plan view. In such an embodiment, the edge of the thin glass substrate UTG may be exposed from the bezel pattern BP, and micro cracks generated at the edge of the thin glass substrate UTG may be examined through an inspection device.

The upper module UM includes an upper film DL. The upper film DL may include a synthetic resin film. The synthetic resin film may contain polyimide, polycarbonate, polyamide, triacetylcellulose, polymethylmethacrylate, or polyethylene terephthalate.

The upper film DL may absorb an external impact applied to the front surface of the display device DD. In an alternative embodiment of the disclosure, the upper film DL may be omitted. The upper module UM may include a second adhesive layer AL2 that couples the upper film DL and the window WM and a third adhesive layer AL3 that couples the upper film DL and the display module DM.

The lower module LM_a may include a panel protection layer PPL, a barrier layer BRL, the support layer PLT, and fourth to sixth adhesive layers AL4 to AL6. The fourth to sixth adhesive layers AL4 to AL6 may include an adhesive such as a PSA or an OCA. In an embodiment of the disclosure, some of the above-described components may be omitted.

The panel protection layer PPL may be disposed under the display module DM. The panel protection layer PPL may protect the bottom of the display module DM. The panel protection layer PPL may include a flexible synthetic resin film. In an embodiment, for example, the panel protection layer PPL may include polyethylene terephthalate.

In an embodiment of the disclosure, the panel protection layer PPL may include a first panel protection layer PPL_1 that protects the active area AA and the non-active area NAA of the display module DM and a second panel protection layer PPL_2 that protects the region of the bending area BA where the driver chip DIC is mounted.

The fourth adhesive layer AL4 couples the panel protection layer PPL and the display panel DP. The fourth adhesive layer AL4 may include a first portion AL4_1 corresponding to the first panel protection layer PPL_1 and a second portion AL4_2 corresponding to the second panel protection layer PPL_2.

Referring to FIGS. 3 and 5, when the bending area BA is bent, the second panel protection layer PPL_2, together with the region of the bending area BA where the driver chip DIC is mounted, may be disposed under the active area AA and the first panel protection layer PPL_1. The bending area BA may be more easily bent because the panel protection layer PPL is not disposed on a portion of the bending area BA.

The fifth adhesive layer ALS couples the panel protection layer PPL and the barrier layer BRL to each other. The barrier layer BRL may be disposed under the panel protection layer PPL. The barrier layer BRL may increase resistance to a compressive force caused by external pressing. Accordingly, the barrier layer BRL may serve to prevent deformation of the display panel DP. The barrier layer BRL may include a flexible plastic material such as polyimide or polyethylene terephthalate. In an embodiment, the barrier layer BRL may be a colored film having a low light transmittance. The barrier layer BRL may absorb light incident from the outside. In an embodiment, for example, the barrier layer BRL may be a black synthetic resin film. Components disposed under the barrier layer BRL may not be visible to the user when the display device DD is viewed from above the window protection layer PF. In an embodiment of the disclosure, the barrier layer BRL may be disposed only under the first panel protection layer PPL_1.

The sixth adhesive layer AL6 couples the barrier layer BRL and the support layer PLT. The sixth adhesive layer AL6 may include a third portion AL6_1 and a fourth portion AL6_2 spaced apart from each other. The distance (or, gap) SPD by which the third portion AL6_1 and the fourth portion AL6_2 are spaced apart from each other corresponds to the width of the folding area FA and is greater than a gap GP (refer to FIG. 7) that will be described below. The separation distance SPD between the third portion AL6_1 and the fourth portion AL6_2 may be in a range of about 7 millimeters (mm) to about 15 mm, e.g., in a range of about 9 mm to about 13 mm.

In an embodiment, the third portion AL6_1 and the fourth portion AL6_2 are defined by different portions of one adhesive layer. However, the disclosure is not limited thereto. In an embodiment where the third portion AL6_1 is defined by one adhesive layer (e.g., a first adhesive layer or a second adhesive layer), the fourth portion AL6_2 may be defined by another adhesive layer (e.g., the second adhesive layer or a third adhesive layer). The above-described definition may be applied not only to the sixth adhesive layer AL6 but also to adhesive layers including two portions among adhesive layers to be described below.

The support layer PLT is disposed under the barrier layer BRL. The support layer PLT supports components disposed on the support layer PLT and maintains an unfolded state and a folded state of the display device DD. The support layer PLT has a greater strength than the barrier layer BRL. The support layer PLT includes at least the first support portion PLT_1 corresponding to the first non-folding area NFA1 and the second support portion PLT_2 corresponding to the second non-folding area NFA2. The first support portion PLT_1 and the second support portion PLT_2 are spaced apart from each other in the first direction DR1.

In such an embodiment, the support layer PLT may include the folding portion PLT_F that is disposed between the first support portion PLT_1 and the second support portion PLT_2 and that corresponds to the folding area FA, and the plurality of openings OP may be defined in the folding portion PLT_F. The first support portion PLT_1, the second support portion PLT_2, and the folding portion PLT_F may have a single unitary shape by being integrally formed with each other.

The folding portion PLT_F may prevent infiltration of foreign matter into the open central area of the barrier layer BRL from the first support portion PLT_1 and the second support portion PLT_2 when the electronic device ED illustrated in FIGS. 1B and 1C is folded. The flexibility of the folding portion PLT_F is improved by the plurality of openings OP. In such an embodiment, the flexibility of the support layer PLT may be improved because the sixth adhesive layer AL6 is not disposed on the folding portion PLT_F. In an alternative embodiment of the disclosure, the folding portion PLT_F may be omitted. In such an embodiment, the support layer PLT includes only the first support portion PLT_1 and the second support portion PLT_2 spaced apart from each other.

In an embodiment of the disclosure, the support layer PLT may include a non-metallic material. The support layer PLT may contain a fiber reinforced composite. The support layer PLT may contain reinforced fibers disposed inside a matrix part. The reinforced fibers may be carbon fibers or glass fibers. The matrix part may contain a polymer resin. The matrix part may include a thermoplastic resin. In an embodiment, for example, the matrix part may include a polyamide-based resin or a polypropylene-based resin. In an embodiment, for example, the fiber reinforced composite may be carbon fiber reinforced plastic ("CFRP") or glass fiber reinforced plastic ("GFRP").

A detection sensor MSS a includes a first sub-detection sensor SMS1_a disposed under the first support portion PLT_1 and a second sub-detection sensor SMS2_a disposed under the second support portion PLT_2. The first and second sub-detection sensors SMS1_a and SMS2_a may not overlap the folding area FA and may be disposed adjacent to the folding area FA.

Although not illustrated in FIG. 5, a bending protection layer may be additionally disposed on the bending area BA. The bending protection layer, together with the bending area BA, may be bent to protect the bending area BA from an external impact.

Figure 6A:
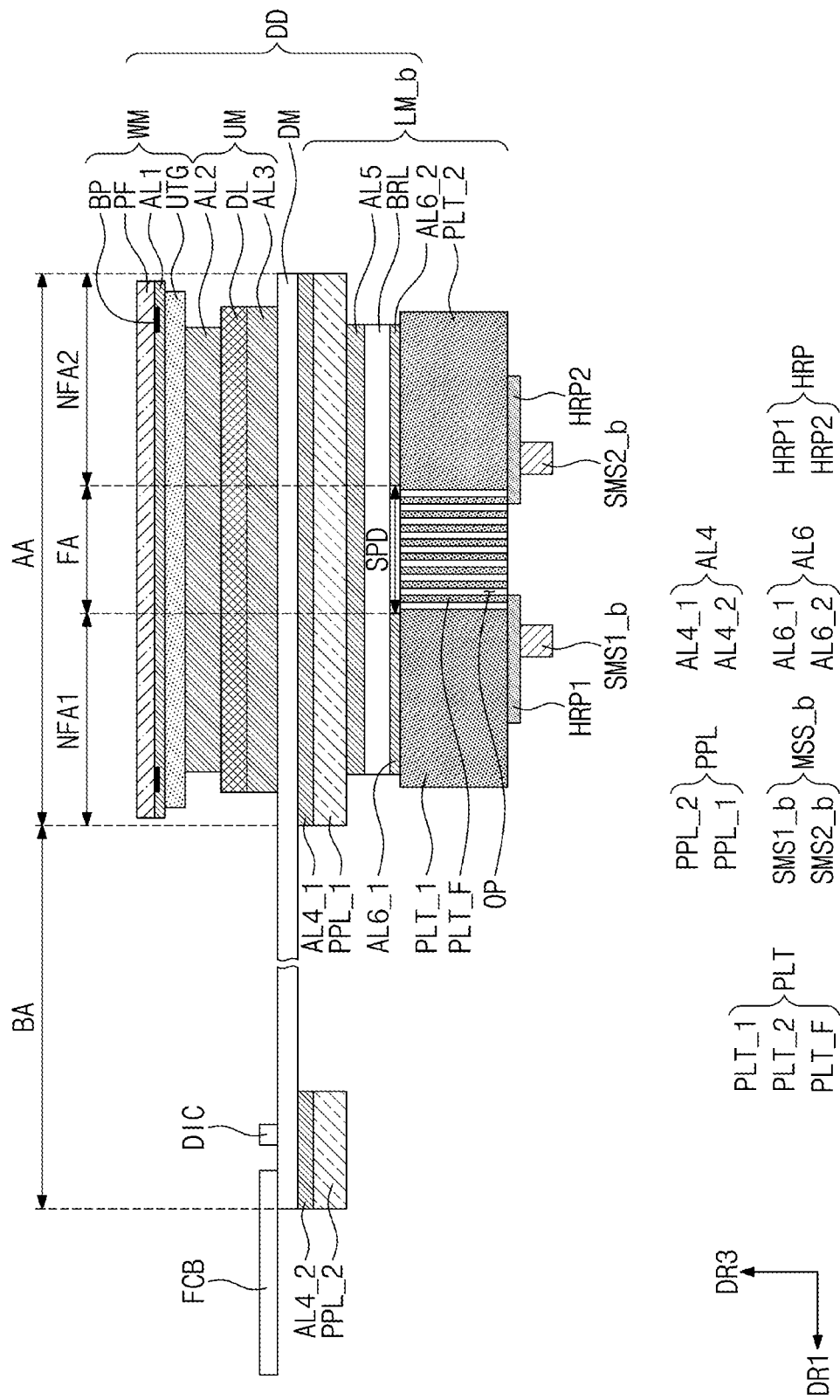
FIGS. 6A and 6B are sectional views of display devices according to embodiments of the disclosure.
Figure 6B:
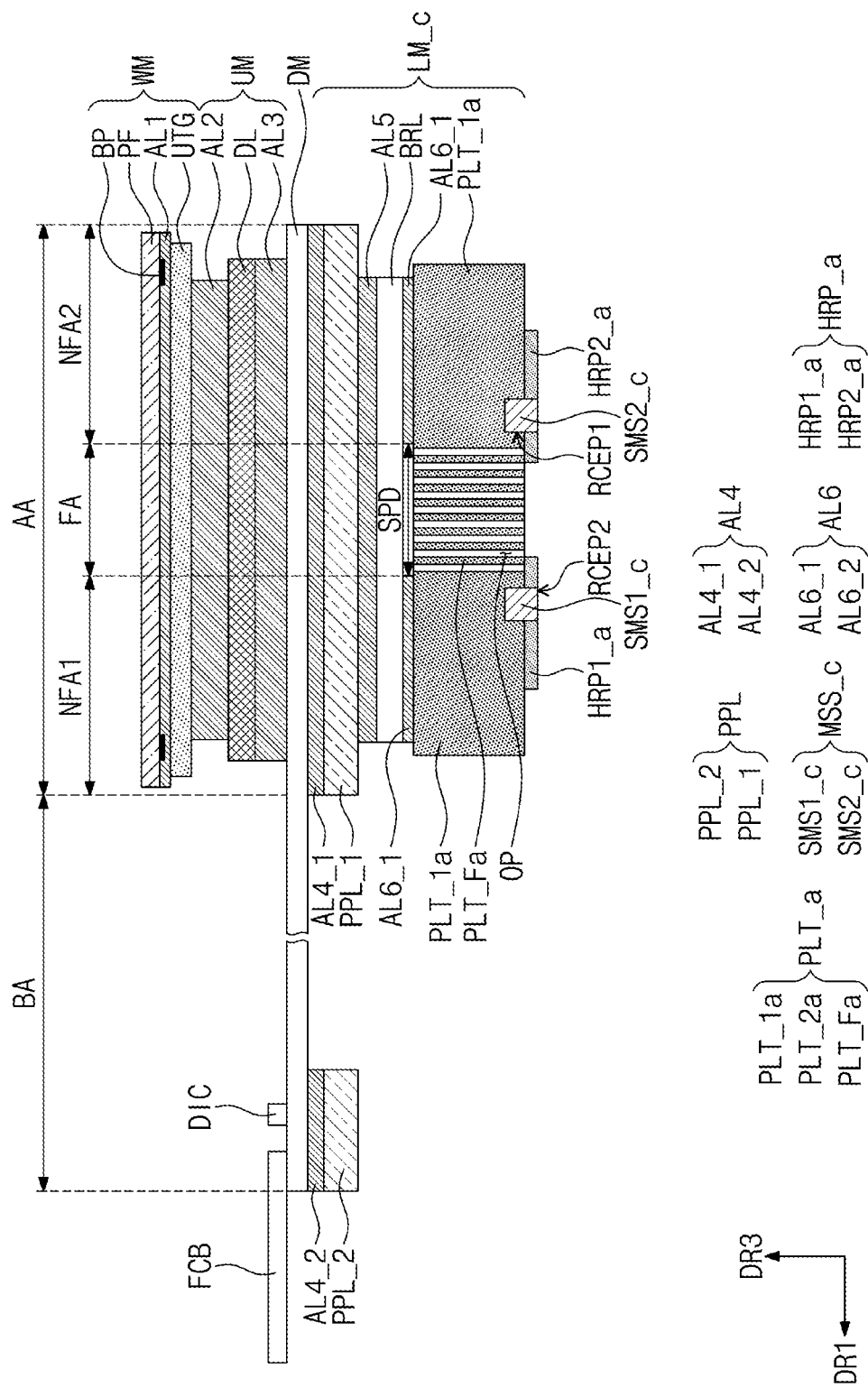

FIGS. 6A and 6B are sectional views of display devices according to embodiments of the disclosure. Hereinafter, the same or like components as the components described above with reference to FIG. 5 will be labeled with the same reference numerals, and any repetitive detailed descriptions thereof will be omitted or simplified.

Referring to FIG. 6A, in an embodiment, a lower module LM_b may include a panel protection layer PPL, a barrier layer BRL, a support layer PLT, fourth to sixth adhesive layers AL4 to AL6, and a heat radiating layer HRP.

The heat radiating layer HRP is disposed under the support layer PLT. The heat radiating layer HRP may include a first heat radiating layer HRP1 overlapping a first support portion PLT_1 and a second heat radiating layer HRP2 overlapping a second support portion PLT_2. In an embodiment of the disclosure, a portion of the first heat radiating layer HRP1 and a portion of the second heat radiating layer HRP2 may overlap a folding area FA. The first and second heat radiating layers HRP1 and HPR2 may radiate heat generated from electronic parts disposed below. The first and second heat radiating layers HRP1 and HRP2 may have a structure in which adhesive layers and graphite layers are alternately stacked one on another.

A detection sensor MSS b includes a first sub-detection sensor SMS1_b disposed under the first heat radiating layer HRP1 and a second sub-detection sensor SMS2_b disposed under the second heat radiating layer HRP2.

Referring to FIG. 6B, in an alternative embodiment, a lower module LM_b may include a panel protection layer PPL, a barrier layer BRL, a support layer PLT_a including a folding portion PLT_Fa, fourth to sixth adhesive layers AL4 to AL6, and a heat radiating layer HRP_a. In an embodiment of the disclosure, the support layer PLT_a includes first receiving sections RCEP1. In such an embodiment, first and second support portions PLT_1a and PLT 2a may include the first receiving sections RCEP1, respectively. The first receiving sections RCEP1 may be defined by spaces in which detection sensors MSS_c are accommodated. In an embodiment, the first receiving sections RCEP1 may have a concave shape defined on the first and second support portions PLT_1a and PLT_2a as illustrated in FIG. 6B, but the disclosure is not limited thereto. Alternatively, the first receiving sections RCEP1 may be formed through the first and second support portions PLT_1a and PLT_2a.

The heat radiating layer HRP_a includes second receiving sections RCEP2 corresponding to the first receiving sections RCEP1. In an embodiment of the disclosure, a first heat radiating layer HRP1 a includes a second receiving section RCEP2 corresponding to the first receiving section RCEP1 defined in the first support portion PLT_1a. A second heat radiating layer HRP2_a includes a second receiving section RCEP2 corresponding to the first receiving section RCEP1 defined in the second support portion PLT 2a. In an embodiment, the second receiving sections RCEP2 may be defined or formed through the first and second heat radiating layers HRP1_a and HRP2_a as illustrated in FIG. 6B, but the disclosure is not limited thereto. In an alternative embodiment, for example, the first and second heat radiating layers HRP1_a and HRP2_a may not include a second receiving section and may be disposed along the first receiving sections RCEP1. In such an embodiment, the detection sensors MSS_c may be located on the first and second heat radiating layers HRP1_a and HRP2_a disposed in the first receiving sections RCEP1.

The detection sensors MSS_c include a first sub-detection sensor SMS1_c and a second sub-detection sensor SMS2_c that are disposed to correspond to the first and second receiving sections RCEP1 and RCEP2, respectively. In such an embodiment where the first and second sub-detection sensor SMS1_c and SMS2_c are disposed to correspond to the first and second receiving sections RCEP1 and RCEP2, an increase in the thickness of the display device DD in the third direction DR3 may be prevented.

Figure 7:
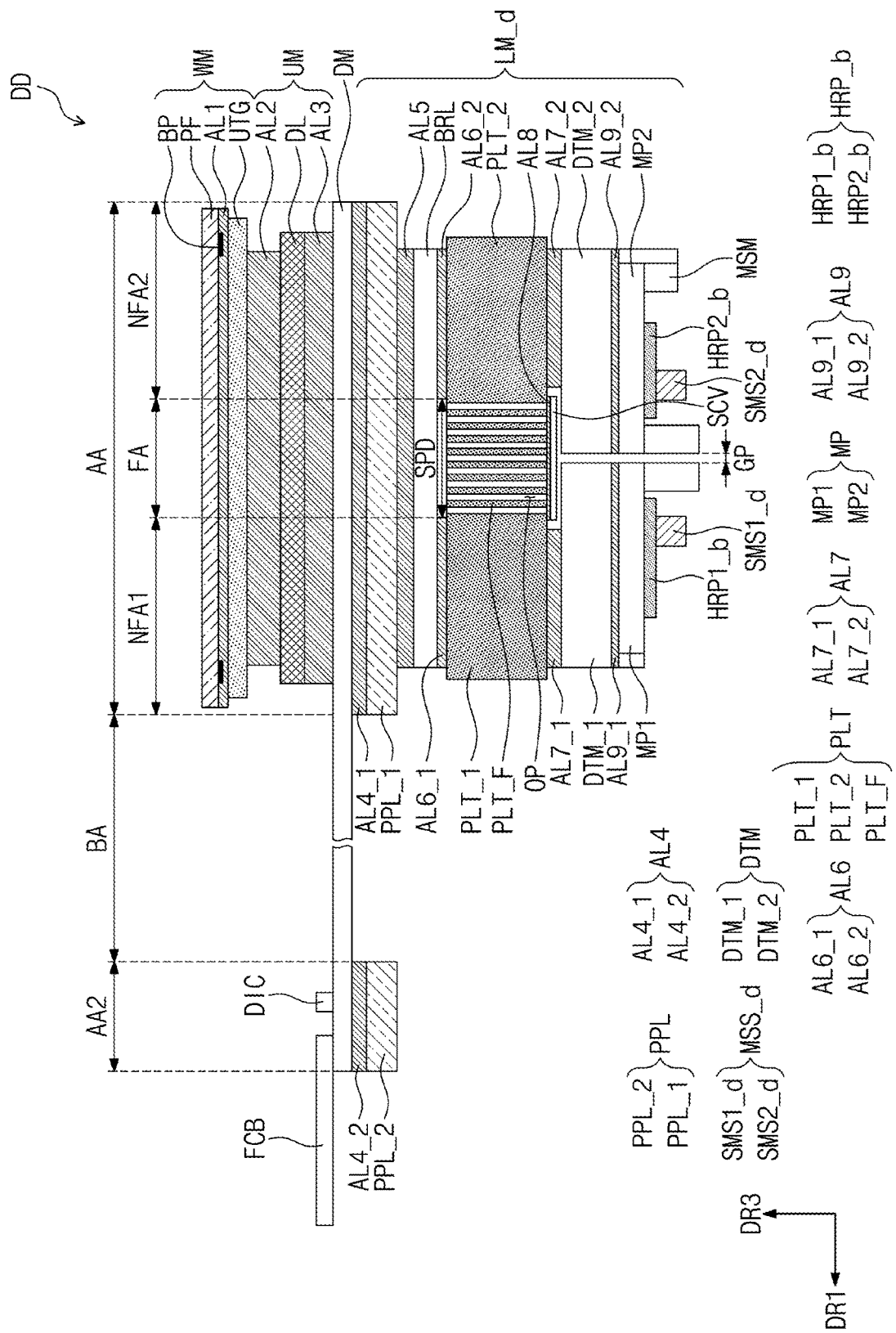
FIG. 7 is a sectional view of a display device according to an embodiment of the disclosure.

FIG. 7 is a sectional view of a display device according to an embodiment of the disclosure. Hereinafter, the same or like components as the components described above with reference to FIGS. 5 to 6B will be labeled with the same reference numerals, and any repetitive detailed descriptions thereof will be omitted or simplified.

Referring to FIG. 7, in an embodiment, a lower module LM_d may include a panel protection layer PPL, a barrier layer BRL, a support layer PLT, a cover layer SCV, a digitizer DTM, a metal plate MP (referred to as a second support layer), a heat radiating layer HRP_b, and fourth to ninth adhesive layers AL4 to AL9. The seventh to ninth adhesive layers AL7 to AL9 may include an adhesive such as a PSA or an OCA. In such an embodiment of the disclosure, some of the aforementioned components may be omitted. In an embodiment, for example, the metal plate MP or the heat radiating layer HRP and an adhesive layer related thereto may be omitted.

The cover layer SCV and the digitizer DTM are disposed under the support layer PLT. The cover layer SCV is disposed to overlap a folding area FA. The digitizer DTM may include a first digitizer DTM_1 and a second digitizer DTM_2 that overlap a first support portion PLT_1 and a second support portion PLT_2, respectively. A portion of the first digitizer DTM_1 and a portion of the second digitizer DTM_2 may be disposed under the cover layer SCV. In an embodiment of the disclosure, the support layer PLT may include at least one material selected from materials capable of transmitting an electro-magnetic field generated from the digitizer DTM without loss or with minimal loss.

The seventh adhesive layer AL7 couples the support layer PLT and the digitizer DTM to each other, and the eighth adhesive layer AL8 couples the cover layer SCV and the support layer PLT to each other. The seventh adhesive layer AL7 may include a fifth portion AL7_1 that couples the first support portion PLT_1 and the first digitizer DTM_1 to each other and a sixth portion AL7_2 that couples the second support portion PLT_2 and the second digitizer DTM_2 to each other.

The cover layer SCV may be disposed between the fifth portion AL7_1 and the sixth portion AL7_2 in the first direction DR1. The cover layer SCV may be spaced apart from the digitizer DTM to prevent interference with the digitizer DTM in an unfolded state. The sum of the thickness of the cover layer SCV and the thickness of the eighth adhesive layer AL8 may be smaller than the thickness of the seventh adhesive layer AL7.

The cover layer SCV may cover openings OP of a folding portion PLT_F. The cover layer SCV may have a lower elastic modulus than the support layer PLT. In an embodiment, for example, the cover layer SCV may include thermoplastic poly-urethane, rubber, or silicone, but is not limited thereto.

The digitizer DTM, also referred to as an electromagnetic resonance ("EMR") sensing panel, includes a plurality of loop coils that generate a magnetic field of a preset resonant frequency with an electronic pen. The magnetic field formed by the loop coils is applied to an LC resonance circuit of the electronic pen that is constituted by an inductor (a coil) and a capacitor. The coil generates a current by the received magnetic field and transfers the generated current to the capacitor. The capacitor charges the current input from the coil and discharges the charged current to the coil. Accordingly, a magnetic field of a resonant frequency is emitted to the coil. The magnetic field emitted by the electronic pen may be absorbed by the loop coils of the digitizer DTM again, and thus the position of the electronic pen adjacent to a touch screen may be determined.

The first digitizer DTM_1 and the second digitizer DTM_2 may be spaced apart from each other by the predetermined gap GP. The gap GP may be in a range of about 0.3 mm to about 3 mm and may be located to correspond to the folding area FA.

The metal plate MP is disposed under the digitizer DTM. The metal plate MP may include a first metal plate MP1 and a second metal plate MP2 that overlap the first support portion PLT_1 and the second support portion PLT_2, respectively. The metal plate MP may absorb an external impact applied from below. In an embodiment of the disclosure, the metal plate MP may include a metallic material such as stainless steel.

The ninth adhesive layer AL9 couples the digitizer DTM and the metal plate MP to each other. The ninth adhesive layer AL9 may include a seventh portion AL9_1 and an eighth portion AL9_2 that correspond to the first metal plate MP1 and the second metal plate MP2, respectively.

The heat radiating layer HRP_b may be disposed under the metal plate MP. The heat radiating layer HRP b may include a first heat radiating layer HRP1_b and a second heat radiating layer HRP2_b that overlap the first metal plate MP1 and the second metal plate MP2, respectively.

A magnetic-field shielding sheet MSM is disposed under the metal plate MP. The magnetic-field shielding sheet MSM shields a magnetic field generated from a magnetic material (not illustrated) that is disposed below. The magnetic-field shielding sheet MSM may prevent interference of the magnetic field generated from the magnetic material with the digitizer DTM.

The magnetic-field shielding sheet MSM includes a plurality of portions. At least some of the plurality of portions may have a different thickness from another. The plurality of portions may be disposed to correspond to steps of a bracket (not illustrated) that is disposed on a lower side of the display device DD. The magnetic-field shielding sheet MSM may have a structure in which magnetic-field shielding layers and adhesive layers are alternately stacked one on another. A portion of the magnetic-field shielding sheet MSM may be attached directly to the metal plate MP.

A detection sensor MSS_d includes a first sub-detection sensor SMS1_d disposed under the first heat radiating layer HRP1_b and a second sub-detection sensor SMS2_d disposed under the second heat radiating layer HRP2_b.

FIG. 8 is a sectional view of a partial area of a display module according to an embodiment of the disclosure.

In embodiments shown in FIGS. 3 to 7, the detection sensor MSS is disposed on the rear side of the display device DD (refer to FIG. 2). However, the disclosure is not limited thereto. In an alternative embodiment, as shown in FIG. 8, the detection sensor MSS may be disposed inside the display module DM_a. In such an embodiment, the detection sensor MSS may be disposed inside an input sensing layer ISP_a included in the display module DM_a.

FIG. 8 illustrates a sectional view of a first non-folding area NFA1 of the display module DM_a. Referring to FIG. 8, the display module DM_a includes a display panel DP_a and the input sensing layer ISP_a. The display panel DP_a includes a base layer BL, a circuit element layer DP_CL, a display element layer DP_ETD, and an encapsulation layer ENP.

In an embodiment of the disclosure, the base layer BL may include a synthetic resin layer. The synthetic resin layer may include a thermosetting resin. The base layer BL may have a multi-layer structure. In an embodiment, for example, the base layer BL may have a three-layer structure including a synthetic resin layer, an adhesive layer, and a synthetic resin layer. In such an embodiment, the synthetic resin layer may be a polyimide-based resin layer, and the material thereof is not particularly limited. The synthetic resin layers may include at least one selected from an acrylate-based resin, a methacrylate-based resin, a polyisoprene-based resin, a vinyl-based resin, an epoxy-based resin, a urethane-based resin, a celluose-based resin, a siloxane-based resin, a polyamide-based resin, and a perylene-based resin. In an embodiment, the base layer BL may include a glass substrate, a metal substrate, or an organic/inorganic composite substrate.

At least one inorganic layer may be disposed on the upper surface of the base layer BL. The inorganic layer may contain at least one selected from aluminum oxide, titanium oxide, silicon oxide, silicon oxy nitride, zirconium oxide, and hafnium oxide. The inorganic layer may include multiple inorganic layers. The multiple inorganic layers may constitute a barrier layer and/or a buffer layer. In an embodiment, as shown in FIG. 8, the circuit element layer DP_CL may include a buffer layer BFL.

The circuit element layer DP_CL may include a plurality of intermediate insulating layers, a semiconductor pattern, a conductive pattern, a signal line, and the like. The intermediate insulating layers, a semiconductor layer, and a conductive layer may be formed by coating, deposition, or the like. Thereafter, the intermediate insulating layers, the semiconductor layer, and the conductive layer may be selectively subjected to patterning by photolithography. The semiconductor pattern, the conductive pattern, the signal line, and the like included in the circuit element layer DP_CL may be formed in such a way.

The circuit element layer DP_CL may include the buffer layer BFL, a first intermediate insulating layer 100, a second intermediate insulating layer 200, a third intermediate insulating layer 300, a fourth intermediate insulating layer 400, a fifth intermediate insulating layer 500, and a sixth intermediate insulating layer 600.

The buffer layer BFL may improve a coupling force between the base layer BL and the semiconductor pattern. The buffer layer BFL may include silicon oxide layers and silicon nitride layers, and the silicon oxide layers and the silicon nitride layers may be alternately stacked one on another.

The semiconductor pattern may be disposed on the buffer layer BFL. The semiconductor pattern may include polysilicon. Alternatively, without being limited thereto, the semiconductor pattern may include amorphous silicon or metal oxide.

FIG. 8 illustrates only a portion of the semiconductor pattern, and the semiconductor pattern may be additionally disposed in another area of a pixel on a plane. The semiconductor pattern may be arranged across pixels according to a specific rule. The semiconductor pattern may have different electrical properties depending on whether the semiconductor pattern is doped or not. The semiconductor pattern may include a first semiconductor area having a high conductivity and a second semiconductor area having a low conductivity. The first semiconductor area may be doped with an N-type dopant or a P-type dopant. A P-type transistor includes a doped area doped with a P-type dopant. The second semiconductor area may be an undoped area, or may be an area more lightly doped than the first semiconductor area.

The first semiconductor area has a higher conductivity than the second semiconductor area and substantially serves as an electrode or a signal line. The second semiconductor area substantially corresponds to a channel (or, active) area of a transistor. In an embodiment, one portion of the semiconductor pattern may be a channel area of a transistor, another portion may be a source or drain area of the transistor, and another portion may be a connecting electrode or a connecting signal line.

In an embodiment, as illustrated in FIG. 8, a source area SE, a channel area AE, and a drain area DE of a transistor TR are defined by or formed from the semiconductor pattern. The source area SE and the drain area DE may extend from the channel area AE in opposite directions on the section. FIG. 8 illustrates a portion of a connecting signal line CSL formed from the semiconductor pattern. Although not separately illustrated, the connecting signal line CSL may be electrically connected to the drain area DE of the transistor TR on a plane.

The first intermediate insulating layer 100 is disposed on the buffer layer BFL. The first intermediate insulating layer 100 commonly overlaps a plurality of pixels and covers the semiconductor pattern. The first intermediate insulating layer 100 may be an inorganic layer and/or an organic layer and may have a single layer structure or a multi-layer structure. The first intermediate insulating layer 100 may include at least one selected from aluminum oxide, titanium oxide, silicon oxide, silicon oxy nitride, zirconium oxide, and hafnium oxide. In such an embodiment, the first intermediate insulating layer 100 may be a single layer of silicon oxide. Not only the first intermediate insulating layer 100 but also each of the second to sixth intermediate insulating layers 200, 300, 400, 500, and 600 may be an inorganic layer and/or an organic layer and may have a single layer structure or a multi-layer structure. The inorganic layer may include at least one selected from the aforementioned materials.

A gate GE of the transistor TR is disposed on the first intermediate insulating layer 100. The gate GE may be a portion of a metal pattern. The gate GE may overlap the channel area AE. The gate GE may function as a mask in a process of doping the semiconductor pattern.

The second intermediate insulating layer 200 covering the gate GE is disposed on the first intermediate insulating layer 100. The second intermediate insulating layer 200 may commonly overlap the pixels. The second intermediate insulating layer 200 may be an inorganic layer and/or an organic layer and may have a single layer structure or a multi-layer structure. In an embodiment, the second intermediate insulating layer 200 may be a single layer of silicon oxide.

An upper electrode UE is disposed on the second intermediate insulating layer 200. The upper electrode UE may overlap the gate GE. The upper electrode UE may be a portion of the metal pattern. A portion of the gate GE and the upper electrode UE overlapping the gate GE may define a capacitor. In an alternative embodiment of the disclosure, the upper electrode UE may be omitted.

The third intermediate insulating layer 300 covering the upper electrode UE is disposed on the second intermediate insulating layer 200. The third intermediate insulating layer 300 may commonly overlap the pixels. The third intermediate insulating layer 300 may be an inorganic layer and/or an organic layer and may have a single layer structure or a multi-layer structure. In an embodiment, the third intermediate insulating layer 300 may be a single layer of silicon oxide.

A first connecting electrode CNE1 may be disposed on the third intermediate insulating layer 300. The first connecting electrode CNE1 may be connected to the connecting signal line CSL through a first contact hole CNT1 defined through the first, second, and third intermediate insulating layers 100, 200, and 300.

The fourth intermediate insulating layer 400 may be disposed on the third intermediate insulating layer 300. In an embodiment, the fourth intermediate insulating layer 400 may be a signal layer of silicon oxide.

The fifth intermediate insulating layer 500 is disposed on the fourth intermediate insulating layer 400. The fifth intermediate insulating layer 500 may be an organic layer. A second connecting electrode CNE2 may be disposed on the fifth intermediate insulating layer 500. The second connecting electrode CNE2 may be connected to the first connecting electrode CNE1 through a second contact hole CNT2 defined through the fourth and fifth intermediate insulating layers 400 and 500.

The sixth intermediate insulating layer 600 covering the second connecting electrode CNE2 is disposed on the fifth intermediate insulating layer 500. In an embodiment, the sixth intermediate insulating layer 600 may be an organic layer.

The display element layer DP_ETD may be disposed or formed on the circuit element layer DP_CL. In an embodiment of the disclosure, the display element layer DP ETD may include a light emitting element ETD and a pixel defining film PDL.

The light emitting element ETD may include a first electrode E1 disposed on the circuit element layer DP_CL, an emissive layer EML disposed on the first electrode EL1, and a second electrode EL2 disposed on the emissive layer EML.

The first electrode EL1 is disposed on the sixth intermediate insulating layer 600. The first electrode EL1 is connected to the second connecting electrode CNE2 through a third contact hole CNT3 defined through the sixth intermediate insulating layer 600.

The pixel defining film PDL may be disposed on the sixth intermediate insulating layer 600 and may cover a portion of the first electrode EL1. A pixel opening is defined in the pixel defining film PDL. The pixel opening exposes at least a portion of the first electrode EL1. In an embodiment of the disclosure, an emissive area PXA may correspond to a partial area of the first electrode EL1 exposed by the pixel opening. A non-emissive area NPXA may surround the emissive area PXA.

The emissive layer EML is disposed on the first electrode EL1. The emissive layer EML may be disposed in an area corresponding to the pixel opening. In an embodiment, the emissive layer EML may be separately disposed for each of the pixels. The emissive layer EML may include a luminescent material including a fluorescent material or a phosphorescent material. The luminescent material may include an organic luminescent material or an inorganic luminescent material, but not being limited thereto.

The second electrode EL2 is disposed on the emissive layer EML. The second electrode EL2 is provided in the form of one common electrode and is commonly disposed for the plurality of pixels.

In an embodiment of the disclosure, the light emitting element ETD may further include a hole control layer and an electron control layer. The hole control layer may be disposed between the first electrode EL1 and the emissive layer EML and may further include a hole injection layer. The electron control layer may be disposed between the emissive layer EML and the second electrode EL2 and may further include an electron injection layer.

The encapsulation layer ENP may be disposed on the display element layer DP_ETD. The encapsulation layer ENP may be disposed on the second electrode EL2.

The encapsulation layer ENP is commonly disposed for the plurality of pixels. In an embodiment, the encapsulation layer ENP may directly cover the second electrode EL2. In an embodiment of the disclosure, a capping layer covering the second electrode EL2 may be additionally disposed between the encapsulation layer ENP and the second electrode EL2. In such an embodiment, the encapsulation layer ENP may directly cover the capping layer.

The encapsulation layer ENP may include a first inorganic layer IML1, an organic layer OL, and a second inorganic layer IML2. The first inorganic layer IML1 and the second inorganic layer IML protect the light emitting element ETD from moisture and oxygen, and the organic layer OL protects the light emitting element ETD from foreign matter such as dust particles. The first inorganic layer IML1 and the second inorganic layer IML2 may include a silicon nitride layer, a silicon oxy nitride layer, a silicon oxide layer, a titanium oxide layer, or an aluminum oxide layer. The organic layer OL may include an acrylate-based organic layer, but is not limited thereto.

The first inorganic layer IML1 may be disposed on the light emitting element ETD. The organic layer OL may be disposed on the first inorganic layer IML1. The second inorganic layer IML2 may be disposed on the organic layer OL.

The input sensing layer ISP_a may be disposed or formed on the display panel DP_a. The input sensing layer ISP_a may include a base insulating layer BIL, a first conductive layer CL1, a first sensing insulation layer SILL a second conductive layer CL2, and a second sensing insulation layer SIL2. In an embodiment of the disclosure, the first and second sensing insulation layers SIL1 and SIL2 may be inorganic layers and/or organic layers and may have a single layer structure or a multi-layer structure.

The base insulating layer BIL may be disposed directly on the encapsulation layer ENP. In an embodiment, for example, the base insulating layer BIL may be brought into direct contact with the second inorganic layer IML2. The base insulating layer BIL may have a single layer structure or a multi-layer structure.

The first conductive layer CL1 may be disposed on the base insulating layer BIL. The first sensing insulation layer SIL1 may be disposed on the first conductive layer CL1. The first sensing insulation layer SIL1 may be an inorganic layer and/or an organic layer and may have a single layer structure or a multi-layer structure.

The second conductive layer CL2 may be disposed on the first sensing insulation layer SILL The first conductive layer CL1 and the second conductive layer CL2 may have a single layer structure, or may have a multi-layer structure stacked along the third direction DR3. The conductive layer having a single layer structure may include an electrode layer or a transparent conductive layer.

The first conductive layer CL1 and the second conductive layer CL2 may include first sensor parts SP1, second sensor parts SP2, first connecting parts, and second connecting parts CP2. In an embodiment of the disclosure, the first conductive layer CL1 may include the second connecting parts CP2. The second conductive layer CL2 may include the first sensor parts SP1, the second sensor parts SP2, and the first connecting parts. Alternatively, the first sensor parts SP1, the second sensor parts SP2, and the first connecting parts may be included in the first conductive layer CL1, and the second connecting parts CP2 may be included in the second conductive layer CL2.

The second sensing insulation layer SIL2 may be disposed on the second conductive layer CL2. The second sensing insulation layer SIL2 may be an inorganic layer and/or an organic layer and may have a single layer structure or a multi-layer structure.

In an embodiment of the disclosure, a detection sensor MSS_b may be disposed inside the input sensing layer ISP_a. In an embodiment, the detection sensor MSS b includes a first sensing electrode MEL1 disposed in the first conductive layer CL1 and a second sensing electrode MEL2 disposed in the second conductive layer CL2. The detection sensor MSS_b may measure the modulus of a folding area FA through the first and second sensing electrodes MEL1 and MEL2.

In such an embodiment, when the electronic device ED (refer to FIG. 1) is folded, an elastic force EF (refer to FIG. 4) is applied to the display panel DP_a and the input sensing layer ISP_a included in the folding area FA. Accordingly, the distance between the first and second sensing electrodes MEL1 and MEL2 may be changed, and the detection sensor MSS_b may measure the modulus of the folding area FA, based on the change in the distance between the first and second sensing electrodes MEL1 and MEL2.

Figure 9A:
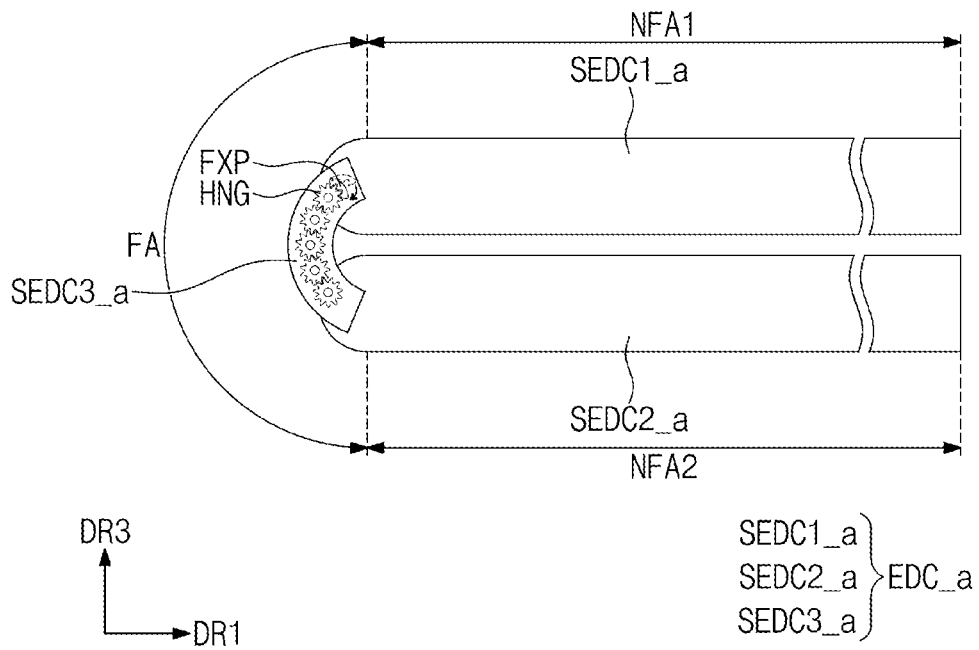
FIGS. 9A and 9B are sectional views of external cases according to embodiments of the disclosure.
Figure 9B:
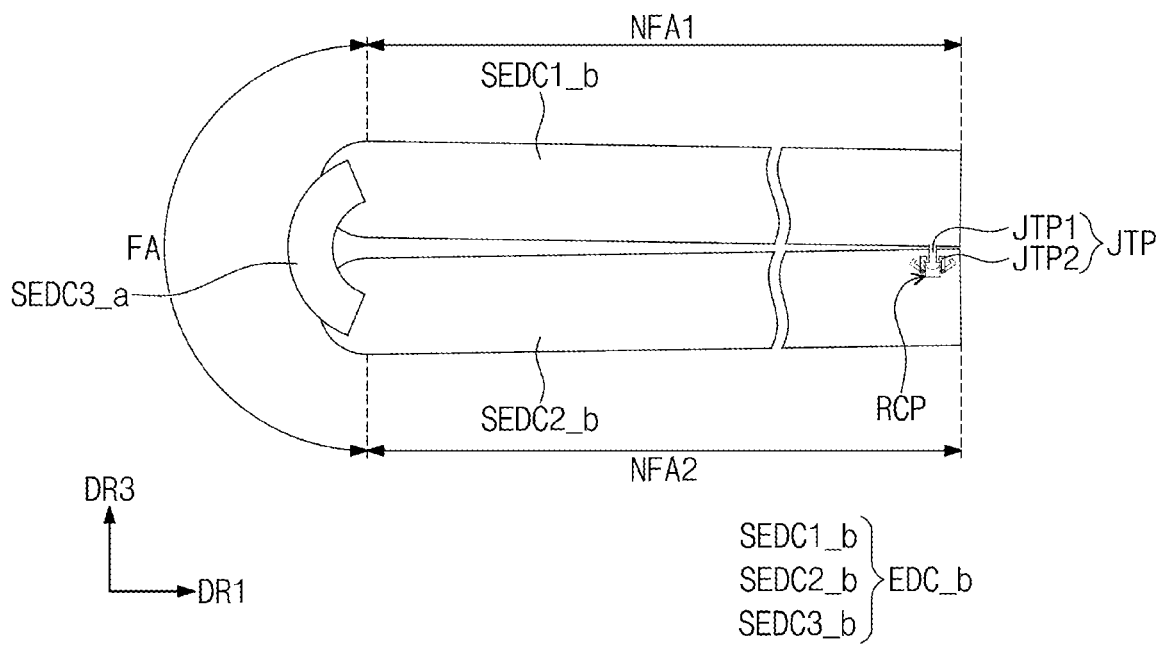

FIGS. 9A and 9B are sectional views of external cases according to embodiments of the disclosure.

For convenience of illustration and description, only the external cases EDC_a and EDC_b, each of which is a part of components of the electronic device ED (refer to FIG. 2), are illustrated in FIGS. 9A and 9B. Hereinafter, the same or components as the components described above with reference to FIG. 2 will be labeled with the same reference numerals, and any repetitive detailed descriptions thereof will be omitted or simplified.

Referring to FIG. 9A, in an embodiment, the external case EDC_a includes a first case SEDC1_a corresponding to a first non-folding area NFA1, a second case SEDC2_a corresponding to a second non-folding area NFA2, and a third case SEDC3_a corresponding to a folding area FA. In an embodiment of the disclosure, the third case SEDC_3a may include the hinge HNG and a fixing part FXP.

The hinge HNG connects the first and second cases SEDC1_a and SECD2_a to each other. In folding and unfolding motions of the electronic device ED, the first and second cases SEDC1_a and SEDC2_a may move through the hinge HNG.

The fixing part FXP controls operation of the hinge HNG. In an embodiment of the disclosure, when the magnitude of the modulus measured by the detection sensor MSS (refer to FIG. 3) is greater than the magnitude of the preset modulus, the fixing part FXP may fix the hinge HNG such that the electronic device ED is not folded or unfolded. In such an embodiment, when the electronic device ED is in a folded state, the fixing part FXP may fix the hinge HNG to prevent the user from unfolding the electronic device ED. Although not illustrated in FIG. 9A, the electronic device ED may further include a hinge controller that controls operation of the fixing part FXP. When the magnitude of the measured modulus is greater than the magnitude of the preset modulus, the sensing controller SCP (refer to FIG. 3) may transmit a fixing control signal to the hinge controller, and the hinge controller may control the fixing part FXP based on the fixing control signal such that the fixing part FXP is engaged with the hinge HNG to fix the hinge HNG. In embodiments of the disclosure, the shape of the hinge HNG is not limited to the shape of a plurality of gears engaged with each other in FIG. 9A. The hinge HNG may include the shape of a rack gear that allows the first and second cases SEDC1_a and SEDC2_a to move when the electronic device ED is folded or unfolded.

Referring to FIG. 9B, in an alternative embodiment, the external case EDC_b includes a first case SEDC1_b corresponding to a first non-folding area NFA1, a second case SEDC2_b corresponding to a second non-folding area NFA2, and a third case SEDC3_b corresponding to a folding area FA. In such an embodiment of the disclosure, the external case EDC_b may further include a coupling part JTP. The coupling part JTP includes a first coupling part JTP1 included in the first case SEDC1_b and a second coupling part JTP2 included in the second case SEDC2_b. In an embodiment of the disclosure, the second case SEDC2_b may include a coupling receiving section RCP in which the first coupling part JTP1 is accommodated.

In an embodiment of the disclosure, when the magnitude of the modulus measured by the detection sensor MSS (refer to FIG. 3) is greater than the magnitude of the preset modulus, the second coupling part JTP2 may fix the first coupling part JTP1 such that the electronic device ED is not folded or unfolded. In such an embodiment, when the electronic device ED is folded, the first coupling part JTP1 is accommodated in the coupling receiving section RCP. In such an embodiment, the second coupling part JTP2 may be engaged with the first coupling part JTP1 in the case where the magnitude of the modulus measured by the detection sensor MSS (refer to FIG. 3) is greater than the magnitude of the preset modulus. In embodiments of the disclosure, the shape of the coupling part JTP is not limited to the shape illustrated in FIG. 9B. The coupling part JTP may include various shapes to fix the first and second cases SEDC1_b and SEDC2_b when the electronic device ED is folded.

Referring to FIGS. 1B, 4, 9A, and 9B, in a folded state, embodiments of the electronic device ED may measure the modulus of the folding area FA through the detection sensor MSS. In such embodiments, then the measured modulus is greater than the preset modulus, the electronic device ED may display the image IM_a for temperature adjustment on the display area DA to raise the temperature of the electronic device ED. Accordingly, the electronic device ED may be effectively prevented from being unfolded by the user at low temperature and damaged. Furthermore, the electronic device ED may display, on the rear display area BDA, the rear image BIM including a message warning the user not to unfold the electronic device ED. In embodiments, the electronic device ED may fix the external case EDC_a or EDC b through the hinge HNG and the fixing part FXP or the coupling part JTP to prevent the electronic device ED from being unfolded by the user and damaged. The above-described operations may be simultaneously or separately performed.

According to embodiments of the disclosure, the magnitude of a repulsive force applied to the electronic device in a folded state of the electronic device may be measured. Based on the repulsive force, the magnitude of the modulus of the electronic device depending on a temperature change of the electronic device may be measured. Damage to the electronic device may be prevented by adjusting the temperature of the electronic device or controlling a folding motion of the electronic device, based on the magnitude of the measured modulus.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic device comprising:
   a display panel including a folding area and a non-folding area adjacent to the folding area;
   a display controller which controls the display panel; and
   a detection sensor disposed adjacent to the folding area, wherein the detection sensor measures a modulus of the folding area in a folded state of the display panel,
   wherein the display controller controls the display panel based on a measured modulus in a way such that an image for temperature adjustment is displayed on the display panel.

2. The electronic device of claim 1, wherein the detection sensor includes a piezoelectric sensor.

3. The electronic device of claim 1, further comprising:
   a sensing controller which receives a sensing signal including information about the measured modulus from the detection sensor,
   wherein the sensing controller transmits, to the display controller, an image control signal generated by comparing a magnitude of the measured modulus and a magnitude of a preset modulus, and
   wherein the display controller controls the display panel based on the image control signal in a way such that the image for temperature adjustment is displayed on the display panel.

4. The electronic device of claim 3, wherein the sensing controller does not generate, or deactivates, the image control signal when the magnitude of the measured modulus is greater than the magnitude of the preset modulus.

5. The electronic device of claim 1, wherein the image for temperature adjustment is displayed on the folding area.

6. The electronic device of claim 1,
   wherein the non-folding area includes a first non-folding area and a second non-folding area,
   wherein the folding area is disposed between the first non-folding area and the second non-folding area, and
   wherein the electronic device further comprises a first support layer disposed under the display panel.

7. The electronic device of claim 6,
   wherein the detection sensor is disposed under the first support layer, and
   wherein the detection sensor includes:
      a first sub-detection sensor which overlaps the first non-folding area; and
      a second sub-detection sensor which overlaps the second non-folding area.

8. The electronic device of claim 7, wherein the first and second sub-detection sensors do not overlap the folding area.

9. The electronic device of claim 6, further comprising:
   a heat radiating layer disposed under the first support layer,
   wherein the detection sensor is disposed under the heat radiating layer.

10. The electronic device of claim 9, further comprising:
    a digitizer disposed between the first support layer and the heat radiating layer.

11. The electronic device of claim 10, further comprising:
    a second support layer disposed between the digitizer and the heat radiating layer.

12. The electronic device of claim 6,
    wherein the first support layer includes a first receiving section, and
    wherein the detection sensor is disposed under the first support layer to correspond to the first receiving section.

13. The electronic device of claim 12, further comprising:
a heat radiating layer disposed under the first support layer,
wherein the heat radiating layer includes a second receiving section corresponding to the first receiving section, and
wherein the detection sensor is disposed under the heat radiating layer to correspond to the first receiving section and the second receiving section.

14. The electronic device of claim 1, further comprising:
an input sensing layer disposed on the display panel,
wherein the input sensing layer senses an external input,
wherein the detection sensor is disposed inside the input sensing layer.

15. The electronic device of claim 1, further comprising:
an external case in which the display panel is accommodated,
wherein the non-folding area includes a first non-folding area and a second non-folding area,
wherein the folding area is disposed between the first non-folding area and the second non-folding area, and
wherein the external case includes:
a first case corresponding to the first non-folding area;
a second case corresponding to the second non-folding area; and
a third case corresponding to the folding area.

16. The electronic device of claim 15, wherein the third case includes:
a hinge; and
a fixing part which controls an operation of the hinge, and
wherein the fixing part fixes the hinge when a magnitude of the measured modulus is greater than a magnitude of a preset modulus.

17. The electronic device of claim 15,
wherein the first case includes a first coupling part,
wherein the second case includes a second coupling part, and
wherein the first and second coupling parts remain in a coupled state, in which the first and second coupling parts are coupled with each other, when a magnitude of the measured modulus is greater than a magnitude of a preset modulus in the coupled state.

18. An electronic device comprising:
a display panel including a first non-folding area, a second non-folding area, and a folding area disposed between the first non-folding area and the second non-folding area;
a display controller which controls the display panel;
a detection sensor disposed adjacent to the folding area,
wherein the detection sensor measures a modulus of the folding area in a folded state of the display panel; and
an external case in which the display panel and the detection sensor are accommodated,
wherein the external case is fixed in a folded state when a magnitude of a measured modulus is greater than a magnitude of a preset modulus.

19. The electronic device of claim 18,
wherein the external case includes:
a first case corresponding to the first non-folding area;
a second case corresponding to the second non-folding area; and
a third case corresponding to the folding area,
wherein the third case includes:
a hinge; and
a fixing part which controls an operation of the hinge, and
wherein the hinge is fixed when the magnitude of the measured modulus is greater than the magnitude of the preset modulus.

20. The electronic device of claim 18,
wherein the external case includes:
a first case corresponding to the first non-folding area;
a second case corresponding to the second non-folding area; and
a third case corresponding to the folding area,
wherein the first case includes a first coupling part,
wherein the second case includes a second coupling part, and
wherein the first and second coupling parts remain in a coupled state, in which the first and second coupling parts are coupled with each other, when the magnitude of the measured modulus is greater than the magnitude of the preset modulus in the coupled state.

* * * * *